(12) United States Patent
Kwiatkowski et al.

(10) Patent No.: US 6,665,866 B1
(45) Date of Patent: Dec. 16, 2003

(54) EXTENSIBLE COMPILER UTILIZING A PLURALITY OF QUESTION HANDLERS

(75) Inventors: Paul Kwiatkowski, Seattle, WA (US); David Richter, Seattle, WA (US); William Aitken, Mercer Island, WA (US); Brian Dickens, Bellevue, WA (US); Charles Simonyi, Bellevue, WA (US); Muthukrishnan Paramasivam, Seattle, WA (US); Steve Eisner, Seattle, WA (US); Ioannis Samaragdakis, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/322,646

(22) Filed: May 28, 1999

(51) Int. Cl.$^7$ ................................................. G06F 9/45
(52) U.S. Cl. ........................ 717/159; 717/158; 717/144
(58) Field of Search ................................. 717/159, 157, 717/133, 144, 158; 714/38; 709/238, 241; 707/2; 706/49, 46, 59, 60; 370/229, 235, 351, 400, 498

(56) References Cited

U.S. PATENT DOCUMENTS

| | | | | |
|---|---|---|---|---|
| 4,667,290 A | * | 5/1987 | Goss et al. .................. | 717/147 |
| 5,018,075 A | * | 5/1991 | Ryan et al. .................... | 706/46 |
| 5,175,856 A | * | 12/1992 | Van Dyke et al. .......... | 717/151 |
| 5,428,554 A | * | 6/1995 | Laskoski ..................... | 714/38 |
| 5,586,020 A | * | 12/1996 | Isozaki ....................... | 717/159 |
| 5,673,369 A | * | 9/1997 | Kim ............................. | 706/59 |
| 5,790,863 A | | 8/1998 | Simonyi ..................... | 395/707 |
| 5,815,711 A | | 9/1998 | Sakamoto et al. | |
| 5,828,883 A | * | 10/1998 | Hall ........................... | 395/704 |
| 5,854,935 A | * | 12/1998 | Enomoto ..................... | 717/159 |
| 5,870,564 A | * | 2/1999 | Jensen et al. ............... | 709/241 |
| 5,911,072 A | | 6/1999 | Simonyi ..................... | 395/701 |
| 5,950,009 A | * | 9/1999 | Bortnikov et al. .......... | 717/158 |
| 5,966,537 A | * | 10/1999 | Ravichandran ............. | 717/158 |
| 5,974,257 A | | 10/1999 | Austin | |
| 6,006,233 A | * | 12/1999 | Schultz ....................... | 707/101 |
| 6,237,136 B1 | | 5/2001 | Sadahiro | |
| 6,253,369 B1 | | 6/2001 | Cloud et al. | |
| 6,272,673 B1 | | 8/2001 | Dale et al. | |

OTHER PUBLICATIONS

"Optimization Decision Trees Through Heuristically Guided Search", Alberto Martelli et al, ACM Communications, Dec. 1978, Vol 21, No 12, pages pp. 1025–1039.*

"Improved Data—Flow analysis with Path Profiles", Glenn Ammons et al., ACM Apr. 1998, pp. 72–84.*

"Data Path Synthesis Using Path Analysis", R. Bergamaschi et al., ACM, Jul. 1991, pp. 591–596.*

"Memory Efficient Software Synthesis from Dataflow Graph", W. Sung et al, IEEE, May 1998, pp. 137–142.*

"Microarchitecture Support for Dynamic Scheduling of Acyclic Task Graph", Carl Beckmann et al., IEEE Sep. 1992, pp. 140–148.

"Compiler Transformaions for High–Performance Computing", David F. Bacon et al., ACM Computing Surveys vol 26, No 4, Dec. 1994, pp. 345–419.

"Elimination Algorithm for Data Analysis", B. Ryder et al., ACM Computing Survey Vol 18, No 3, Sep. 1986, pp. 277–316.

(List continued on next page.)

*Primary Examiner*—Todd Ingberg
(74) *Attorney, Agent, or Firm*—Lee & Hayes, PLLC

(57) ABSTRACT

A compiler architecture uses a question and answer methodology between a reduction engine and nodes of a graph representing the program being compiled to provide for easy expandability of the compiler. By using the question and answer methodology, additional functionality can be added to the compiler by users, whether they be part of the original design team of the compiler or be a subsequent user.

51 Claims, 8 Drawing Sheets

OTHER PUBLICATIONS

"Understanding C Programs Using the Combined C Graph Representations", David Kinloch et al., IEEE, Aug. 1994, pp. 172–180.

"Call Graph Construction in Object–Oriented Languages", David Grove et al., ACM pp. 108–124, Apr. 1997.*

"Demand Driven Compution of Interproredural Data Flow", Evelyn Duesterwald et al., ACM pp. 37–48, Jan. 1995.*

Compilers Principles, Techniques and Tools, Aifred V. Ano et al Chapters 1–5, Sep. 1985.*

"A Prototype System for Static and Dynamic Program Understanding", David P. Otshefshi et al., IEEE, pp. 93–106, Mar. 1993.*

"Designing the Vser Interfare", Ben Shneiderman Third Edition, p. 12, Jul. 23, 1997.*

"Interactive Animation of Visual Program Execution", Poswig, Vrankar & Moraga, May 1993, IEEE, pp. 180–187.

"6.5.1 Fundamental Definitions", 3 pages, dated May 11, 1999.

* cited by examiner

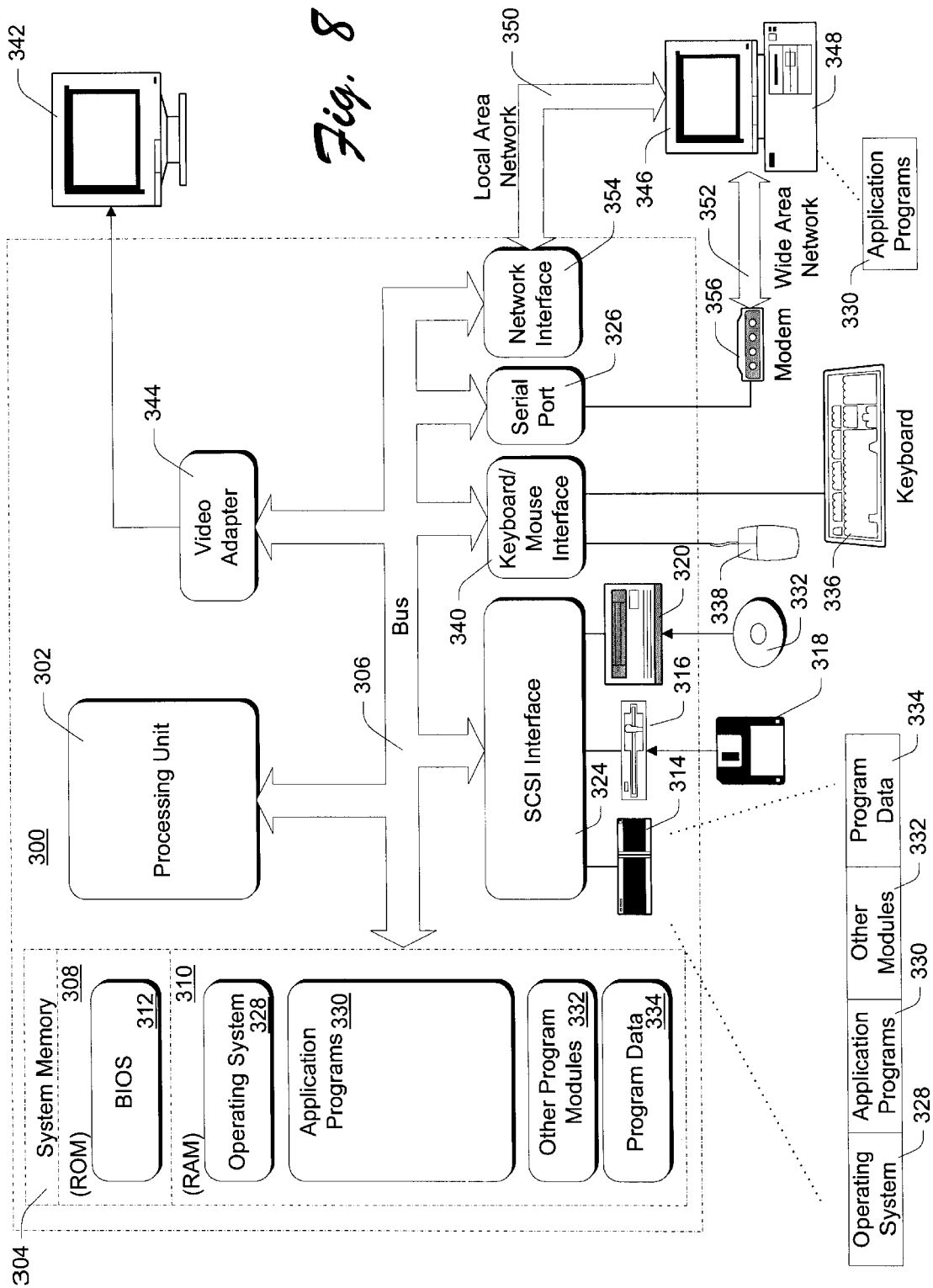

EXTENSIBLE COMPILER UTILIZING A PLURALITY OF QUESTION HANDLERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to compilers, and more particularly to an architecture for an extensible compiler.

BACKGROUND

As computer technology has advanced, computer programs have become correspondingly complex to the point where it is very difficult for a programmer to write an application program in the machine language of the computer. Thus, most programs are written in a high-level language that is easier for the programmer to work with and then converted by a compiler into the machine language of the computer.

The compiler is itself typically a computer program. Compilers can be very complicated to design and construct, often being too complicated for a single individual to design and construct in a timely manner. Teams of individuals working together typically must coordinate their efforts very well in order to have the different portions of the compiler each individual is working on operate together properly. Typically, compilers make it extremely difficult, if not impossible, for an individual not working closely with the team to contribute a portion of the compiler.

Additionally, compilers are typically designed and written for "general" use. That is, rather than writing compilers targeted to specific tasks, industries or fields, a more general type of compiler is written. The result of such generalization is that some functionality (e.g., support for particular instructions) that would be beneficial in other specific tasks, industries or fields is not available in the compiler because such functionality is too specific. In rare cases, compilers are designed and written for specific tasks, industries, or fields. The result of such specialization is that some functionality that would be beneficial for other tasks, industries, or fields is not available in the compiler because such functionality is not needed for the specific task, industry, or field. Typically, neither sort of compiler allows additional functionality to be added, thereby, in the first case, causing additional complexity on the part of the high-level language programmer in order to carry out the desired functions, and in the second case, causing the compiler to fail to be used for the other functions.

The invention described below addresses these disadvantages, providing an extensible compiler architecture.

SUMMARY

A compiler architecture is described herein that provides for easy extensibility. A question and answer methodology is used between a reduction engine and question handlers corresponding to nodes of a graph representing the program being compiled. By using the question and answer methodology, additional functionality can be added to the compiler by users, whether they are part of the original design team of the compiler or a subsequent user.

According to one aspect of the invention, each node in the graph is associated with one or more question handlers. In order to compile the program, the reduction engine dispatches a series of questions to the question handlers, each of which can ask one or more questions of other question handlers. Once all the questions have been answered, the reduction engine is left with a compiled program. All queries to other question handlers are performed via the reduction engine.

According to another aspect of the invention, the information that a question handler obtains is of a semantic rather than structural nature. Each node in the graph is only aware of the other nodes to which it has a direct link, not the entire topology or structure of the graph.

According to another aspect of the invention, a question handler can add new nodes and/or links to the graph, but cannot delete any node or link.

According to another aspect of the invention, by the user adding new nodes, new question handlers for at least some of those new nodes, and possibly new links, new functionality (e.g., instructions) can be supported by the compiler. A question handler corresponding to the new functionality includes the instructions necessary to create additional nodes, links or binary information in the graph, and/or ask questions of other nodes, to carry out the desired functionality.

According to another aspect of the invention, during the compilation process the reduction engine detects when a question was answered with potentially incorrect information. When such a situation is detected, the reduction engine "rolls back" the compilation process, going back to a point where the incorrect information would have been given. The reduction engine then adds a rule that prevents that question from being answered until the appropriate subsequent time, and then proceeds to answer and dispatch other questions.

BRIEF DESCRIPTION OF THE DRAWINGS

The present invention is illustrated by way of example and not limitation in the figures of the accompanying drawings. The same numbers are used throughout the figures to reference like components and/or features.

FIG. 8 shows a general example of a computer that can be used to run a compiler in accordance with one embodiment of the invention.

DETAILED DESCRIPTION

The invention is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. In a distributed computer environment, program modules may be located in both local and remote memory storage devices.

Architecture

Figure 1:
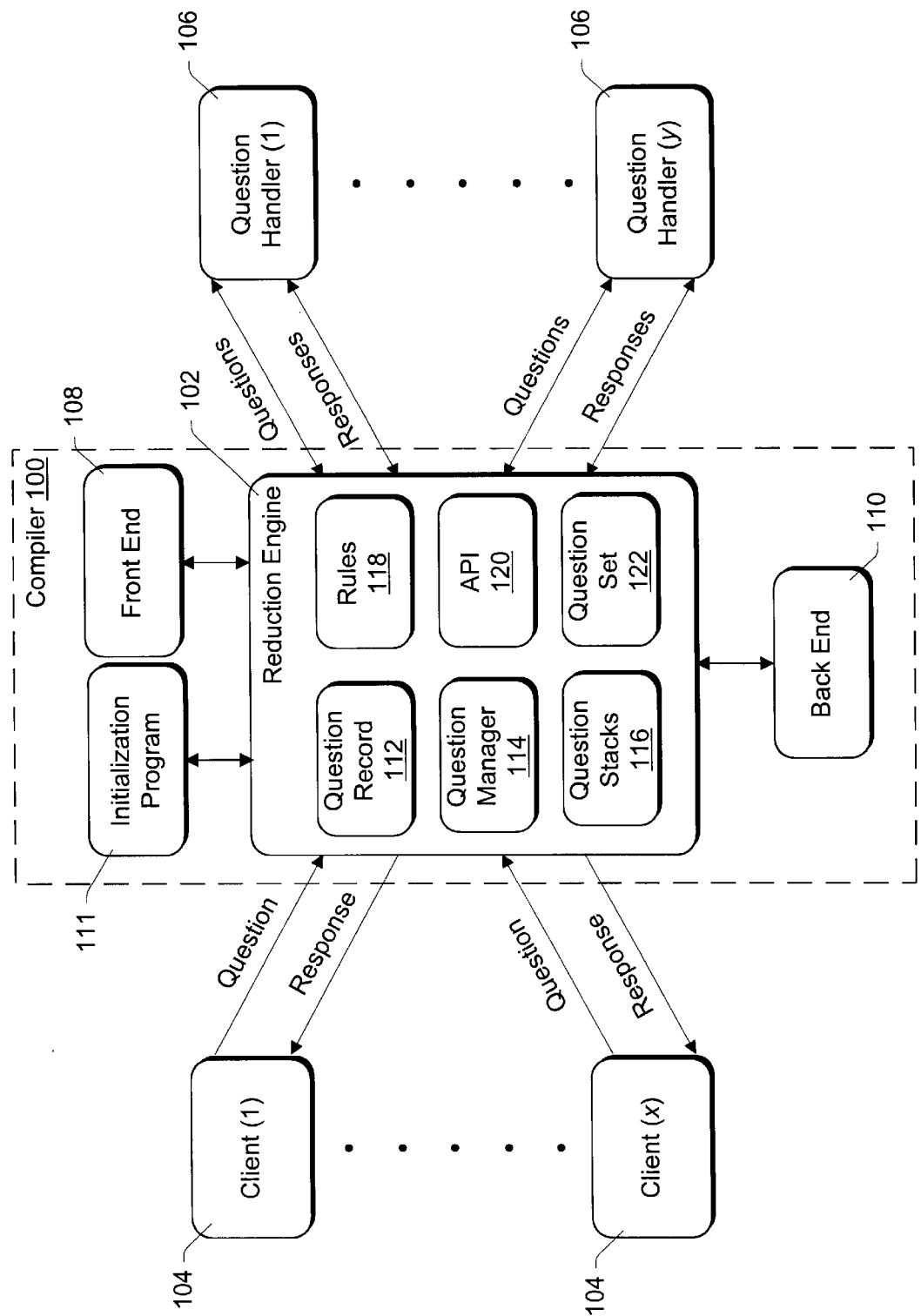
FIG. 1 illustrates an exemplary compiler architecture in accordance with the invention.

FIG. 1 illustrates an exemplary compiler architecture in accordance with the invention. A compiler 100 includes a reduction engine 102 that communicates with one or more clients 104 and one or more question handlers 106. Reduction engine 102 receives questions (or "requests") from both clients 104 and question handlers 106. Additionally, reduction engine 102 can dispatch questions (or "requests") to and receive responses (or "answers") from question handlers 106, and can also provide these responses (or "answers") to clients 104.

Compiler 100 also includes a front end 108 and a back end 110. Front end 108 provides various pre-processing functions, if necessary, to convert received source code into a graph or tree representing the program. The graph has multiple nodes, each of which includes identifiers of links to other nodes and can include tagged blocks of binary data, such as constant values or strings, that can be read from and written to. In the illustrated example, reduction engine 102 generates, based on the graph representing the program, code that is in a lower-level language than the graph, referred to as an intermediary language (IL). Once generated, the intermediary language is provided to back end 110 which operates in a conventional manner to convert the intermediary language to machine executable code. Examples of such intermediary languages include C++ code source, Java bytecode, etc. The conversion of the intermediary language, such as one of the previously listed examples, into machine executable code is well-known to those skilled in the art and thus will not be discussed further except as it pertains to the invention. Alternatively, reduction engine 102 may generate machine executable code directly without the need for back end 110.

When a source program is received, the proper question handler(s) are associated with each node of the graph. An initialization program 111 is invoked to associate question handler(s) with nodes of the graph by generating a data structure (e.g., a hash table) that identifies which question handlers are associated with which nodes of the graph. Alternatively, each node may include identifiers of which question handlers it is associated with. In the illustrated example, initialization program 111 is a separate dynamic link library (DLL). Alternatively, initialization program 111 could be part of front end 108 or part of reduction engine 102. Initialization program 111 includes a mapping of node identifiers to a set of one or more question handlers that are associated with that node identifier. For example, initialization program 111 may include a mapping of four different question handlers that are associated with any "if" node.

Clients 104 are components separate from reduction engine 102 that can submit queries to reduction engine 102 regarding an application program. Examples of clients 104 include a reduction client that allows a user to request that the program (or portion of the program) be compiled, an editor client that assists a user in editing the application program, a debugger client that assists a client in debugging the application program, etc. Examples of questions that a client can ask include: "What is your executable?", "What arguments should we prompt for in this context?", "How should the result of this expression be displayed in the debugger?", "What is the type of this expression?", "Is the value of this expression determinable at compile-time, and if so, what is it?".

Reduction engine 102 includes a question record 112, question manager 114, question stacks 116, rules 118, an application programming interface (API) 120, and a question set 122. Although illustrated as separate components, it is to be appreciated that any one or more of the components 112, 114, 116, 118, and 120 can be combined together. Question record 112 is a record in which information regarding questions asked and their responses is stored. Question manager 114 manages the scheduling of questions, determining which questions are dispatched to question handlers 106 when, as well as the forwarding of responses to the question handlers 106 and clients 104. Question stacks 116 maintain parameters and other information regarding questions that have been dispatched by reduction engine 102 but for which responses have not yet been received, and questions that are blocked from being dispatched. Rules 118 are rules (if any) that are to be followed by question manager 114 in scheduling questions. API 120 provides a programming interface for clients 104 and question handlers 106 to submit questions to reduction engine 102. API 120 also provides a programming interface for question handlers 106 to examine and modify the node corresponding to the question reduction engine 102 dispatched to them. Set 122 stores questions that have been received by reduction engine 102 but not yet dispatched to a question handler 106.

Based on a question received from a client 104, question manager 114 dispatches a series of questions to question handlers 106. Additional questions can then be submitted to reduction engine 102 by question handlers 106, which in turn are dispatched to other question handlers 106 by question manager 114 as appropriate. Eventually, all questions necessary to respond to the client 104 and dispatched by question manager 114 to question handlers 106 are answered, at which point reduction engine 102 can respond to the question provided by the client 104. As discussed in more detail below, each question handler 106 is associated with or "corresponds to" at least one node of the graph representing the program.

In addition to receiving questions from, dispatching questions to, and providing responses to question handlers 106, reduction engine 102 also keeps track of various information regarding these questions in question record 112. Such information can include an identifier of which question handler submitted the question, what question was asked, what question handler the question was sent to, what parameters the question had, what binary information on the node was accessed, what the answer to the question was, what questions the handler for the question submitted, and what outgoing links of the node the handler examined to answer the question. Question record 112 may contain a complete record of all questions asked, or a conservative approximation to a complete record, that is sufficient for the purposes of "roll back" as described below. If an approximate record is kept, it is conservative in the sense that there are no times that an implementation using an approximate record would not roll back and an otherwise equivalent implementation using a complete record would.

The responses to questions are also maintained in record 112 Maintaining record 112 helps to ensure that proper responses are given to a question. By way of example, a first question handler may ask for information on each of the children of the node it corresponds to, and another question handler may subsequently add another child to that node.

Reduction engine 102, by maintaining a record of the first question handler in record 112, can detect that the response it gave is potentially no longer accurate and can "roll back" the effects of the first question handler and re-dispatch its question.

Improper responses can be detected by comparing additions to the graph to previously provided responses maintained in record 112 If a new link or new binary information is added to a node, then all questions previously responded to on this node are checked to verify that their answers remain the same. Any question handler whose answer may change (e.g., a link it looked for is added, binary information it read from the node is written to, etc.) is rolled back (i.e., any additions it made to the graph are removed and any questions it asked are "unasked"). The question is then re-dispatched and the answer compared to the answer received before. If any answer changes, then the compiler "rolls back" any question handlers which were clients of this one (and removes any additions they made to the graph) to re-dispatch them, as discussed in more detail below. Additionally, improper responses can be detected and the compilation process rolled back if the answer to the question is subsequently "influenced" (the use of "influence" is discussed in more detail below).

Alternatively, rather than unconditionally rolling back the question, reduction engine 102 may run the question again and check whether it returns the same answer and whether it wants to ask the same questions and make the same additions to the graph. If the question handler will be asking the same questions, making the same additions to the graph and returning the same answer then it is not necessary to roll back the question handler. In one implementation, if the question handler will be asking a subset of the same questions, and/or making a subset of the same additions, then it is necessary to redispatch the question handler and roll back those questions it no longer asks and those additions it no longer makes, but those questions and additions that did not change would not need to be rolled back and then re-asked/re-added.

Additionally, by maintaining or "caching" such information regarding questions, reduction engine 102 can respond more quickly to subsequent client questions. For example, if a first client (or question handler) asks a question and if a second client (or question handler) subsequently asks the same question, reduction engine 102 can use the responses it has stored in record 112 rather than resubmitting the questions to the question handlers in the graph.

Reduction engine 102 maintains a set 122 into which questions are placed as they are received. Different scheduling algorithms can be used by question manager 114 to determine what order questions are drawn from the set 122 in, such as a breadth-first walk through all orderings, a random reordering of the questions that are causing rollbacks, etc. Additionally, priority may be given to certain questions when the question handlers that submitted the questions are "waiting" and can progress no further in their execution until the answer is provided. Furthermore, one of rules 118 (discussed in more detail below) may block a question. If a question is so blocked, question manager 114 repeatedly checks (at regular or irregular intervals) whether the rule 118 causing the blocking has been satisfied, at which point the blocked question can be dispatched to the appropriate question handler 106.

When question manager 114 determines that a particular question from set 122 is to be dispatched to a question handler 106, question manager 114 uses one of stacks 116 to push procedure call arguments onto, for local storage allocation, etc., and uses an additional data storage structure associated with the stack 116 to maintain information regarding the question (e.g., identifier of the question, the question handler that asked the question, any parameters for the question, etc.) until a response is received and returned to the question handler that submitted the question. A different stack may be used for each question, or alternatively a stack may be used for multiple questions. According to one implementation, a new stack is used each time a question is "blocked" from proceeding any further due to a rule 118 causing that question to wait for a particular event (such as a new link to be added to the graph, as discussed in more detail below). A stack is then discarded when the last question handler on it runs to completion or is "unasked" due to a rollback. Alternatively, each question handler is given its own stack, which is discarded when that question handler runs to completion or is "unasked" due to a rollback.

Situations can arise where a response is provided to a question handler 106 that is no longer accurate. By way of example, a question handler 106 corresponding to an "if" node may query whether it has an "else" node linked to it. At the time the question is submitted, there may be no such "else" link, and a response given to question handler 106 indicating such. However, an "else" link may be added later, thereby making the previous supplied response incorrect.

Reduction engine 102 resolves such problems by maintaining a record of what questions are asked by question handlers, as well as possibly the order in which questions are submitted to question handlers 106 and also possibly maintaining a record of the order in which questions are received from question handlers 106. When the reduction engine 102 discovers that a previous response by the reduction engine 102 to a question handler 106 was incorrect, reduction engine 102 "rolls back", or undoes, all work based on that incorrect response. The reduction engine 102 may roll back more than the minimally necessary amount of work in an implementation dependent manner. All question submissions not undone by the roll back with answers that were rolled back are resubmitted by question manager 114.

Reduction engine 102 also adds a rule to rules 118 indicating that an answer should not be provided to that question until that particular cause of incorrectness has been accounted for, in this example, until the "else" link is added to the graph. Reduction engine 102 then "blocks" that question handler until that condition has been satisfied, at which point the question can be responded to. In this example, that condition is satisfied after the "else" link has been added to the "if". However, other questions that had been submitted to reduction engine 102, as identified in the record maintained by reduction engine 102, can still be submitted to their respective question handlers. Alternatively, additional rules may be created and added to rules 118 in other manners. For example, a rule may be specifically added by a question handler. By way of another example, a programmer could add a rule manually that applies to all programs he or she compiles. By way of yet another example, a programmer could add a rule manually that applies to a specific source program he or she is writing.

In one implementation, roll back undoes all work done since the time when the incorrect answer was supplied (e.g., in the above example, the point where the response to the question handler corresponding to the "if" node was supplied). In another implementation, roll back undoes just that work immediately affected by the incorrect response, and records that it has done so. When that work has completed again with no then-known causes for incorrectness, the new answer from that question handler 106 is compared to the old answer stored by the reduction engine 102. If they are the same, the effects of the roll back are over. Otherwise, those question handlers 106 that received an incorrect answer from this re-done question handler 106 are themselves rolled back in the same fashion. This reduces the work to be redone by the question handlers 106, at the cost of additional bookkeeping by the reduction engine.

After performing such "roll backs", reduction engine 102 can ensure that, if a question handler looks for a link and that link is ever going to be added, the question handler will be blocked until after the link is added. In doing so, reduction engine 102 avoids having to determine whether a particular question should be dispatched before or after a link is created.

There is no guarantee, however, that a question that satisfies the newly generated rule will ever be asked. For example, the order of the asking of the recorded questions may change (such as due to the "if" node's question being blocked in the above example). Thus, the question handler that adds the "else" node may never do so, resulting in a deadlock. If such a deadlock occurs, the question scheduling algorithm rolls back further (e.g., to the first question dispatched by question manager 114) to submit questions in a different order to try to avoid the deadlock.

In the illustrated example, each of the question handlers 106 submits a question to reduction engine 102 as soon as it knows that it needs the answer to the question. Thus, all question handlers 106 do not immediately begin asking questions (or even begin running) as soon as compilation begins. Rather, each question handler waits until it is asked a question that causes it, in turn, to ask a question. Additionally, a question handler 106 can call a "wait" function when it can continue processing instructions no further until it receives an answer to an outstanding question (s). The "wait" function informs reduction engine 102 that the question handler can proceed no further without an answer.

Additionally, reduction engine 102 and question handlers 106 operate based on semantic information rather than structural information regarding the graph representing the program. A node in the graph is only aware of the links that it has to other nodes and these other nodes, and not of other nodes and links in the graph. Information needed by a question handler corresponding to a node is obtained by submitting questions (via reduction engine 102) to the nodes it is linked to rather than by obtaining information regarding the overall topology and structure of the graph.

Additionally, question handlers 106 should only ask questions to obtain information that they need. Since reduction engine 102 keeps track of what questions are asked and what responses are given, asking questions for unneeded information may result in rollbacks being performed unnecessarily.

Furthermore, as in the illustrated example, nodes and links, once added to the graph, are not removed from the graph. A question handler can add nodes and/or links to the graph, but neither the question handler nor the reduction engine can delete nodes or links from the graph (except through the reduction engine performing a roll back, as discussed above).

Figure 2:
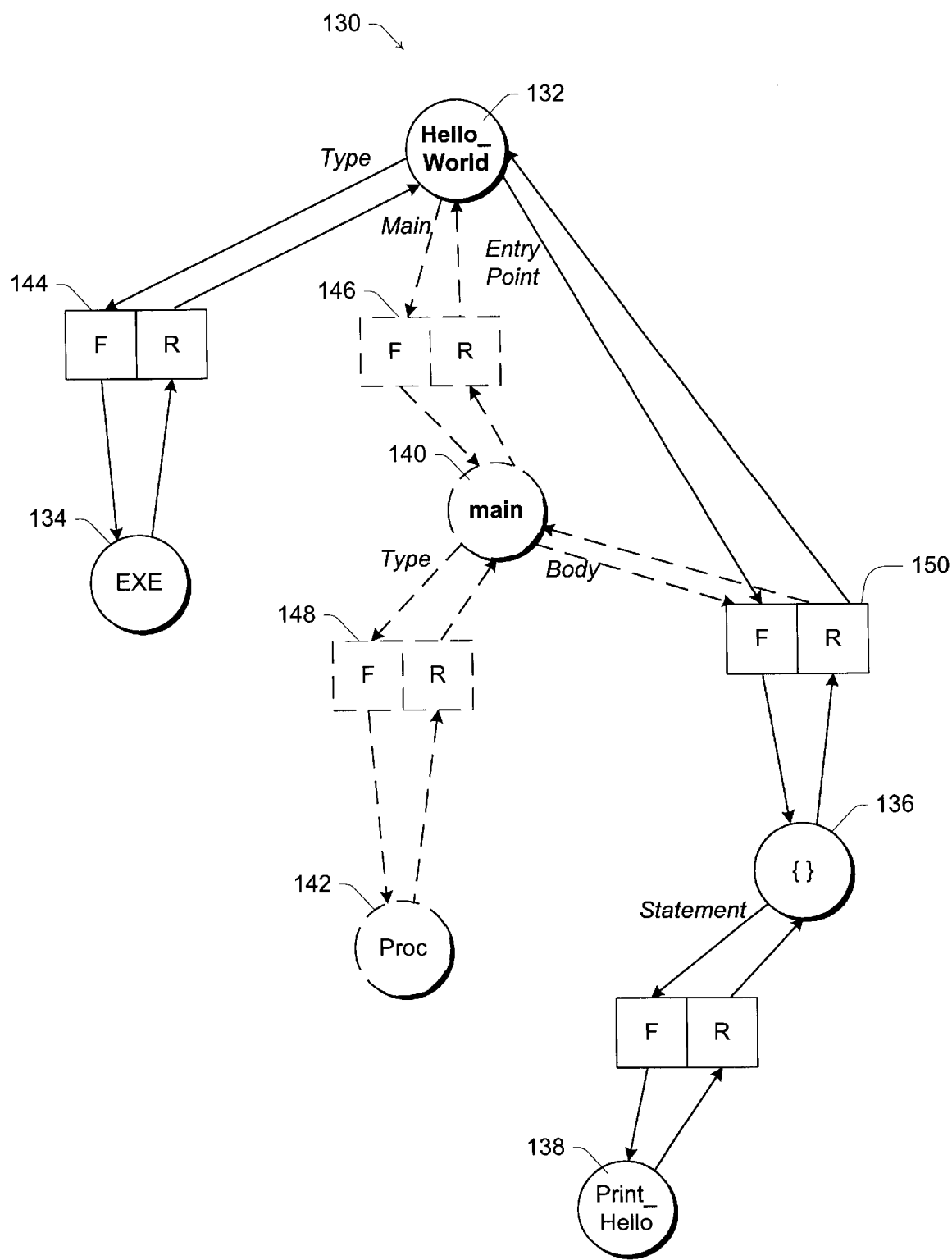
FIGS. 2 and 3 illustrate exemplary graphs representing a computer program.
Figure 3:
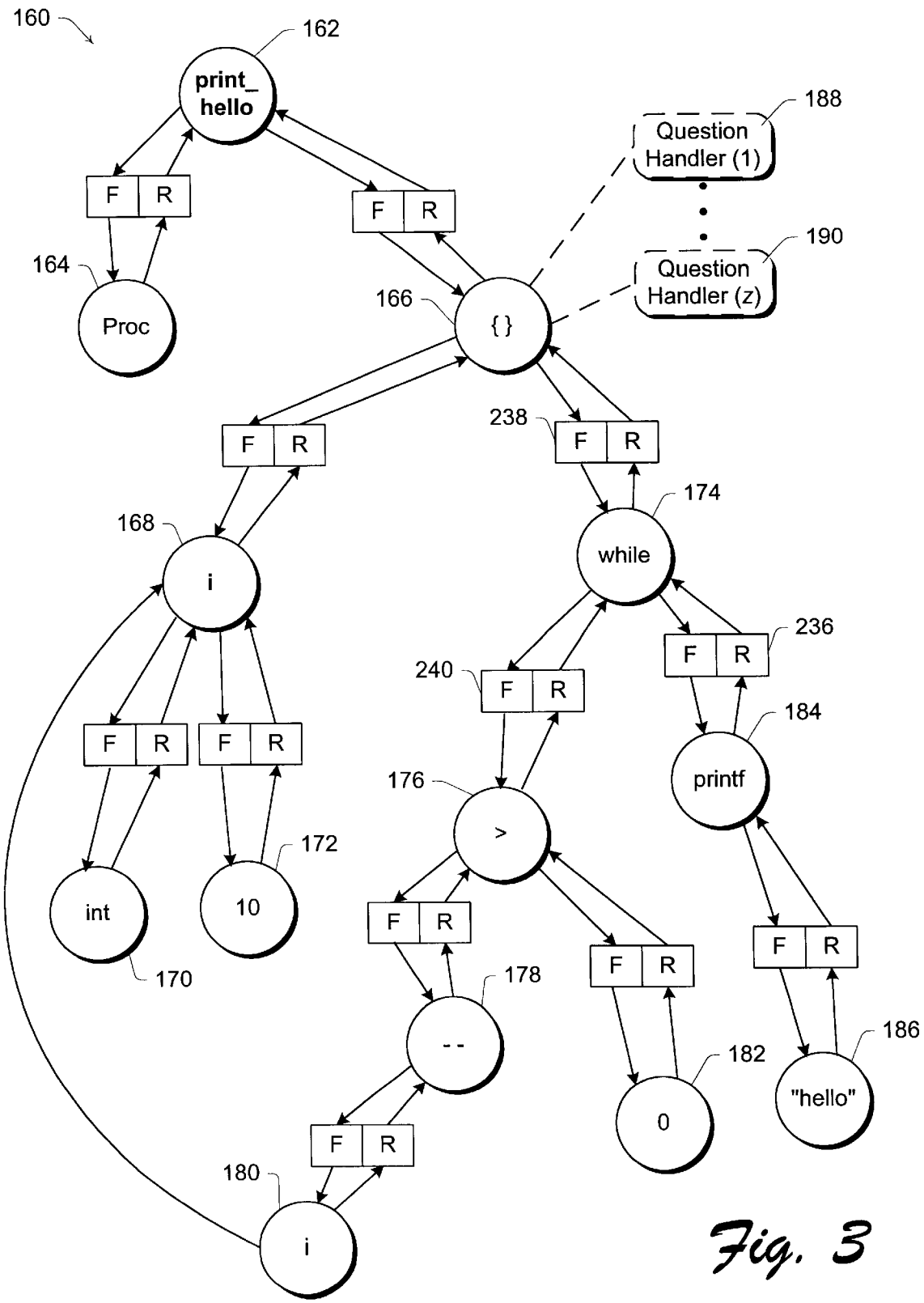

FIGS. 2–3 illustrate exemplary graphs representing a program that prints the word "hello" ten times. Each node or element in the graph is a data structure that includes an identifier of itself and identifier(s) of any nodes it is linked to. It should also be noted that, although illustrated as separate graphs, the graphs in FIGS. 2–3 (as well as FIG. 4) are all part of the same graph corresponding to the program "Hello_World". The graphs used to represent the program can be implemented in different manners. An example of such a graph can be found in U.S. Pat. No. 5,790,863, titled "Method and System for Generating and Displaying a Computer Program", to Charles Simonyi.

The graph includes three different kinds of nodes: expression (EXPR) nodes, declaration (DCL) nodes, and link nodes. Expression and declaration nodes have the following form: (operator, properties [i], operand [i]) where there may be zero or more operands and properties. The operator field and operand fields are pointers to other nodes. An expression node represents an expression in the program. For example, an EXPR node corresponding to a "+" operator, contains a pointer (operator) to a DCL node that defines the operator and contains a pointer (operand [i]) to an EXPR node for each operand. If an operand corresponds to a leaf node of the program graph, then the EXPR node for the operand points to a DCL node that defines the operand (e.g., the definition of a particular integer variable). The operand fields can point to DCL nodes, EXPR nodes, or link nodes. In the illustrated example, a graph includes predefined DCL nodes to describe typical computational constructs (e.g., logical and arithmetic operators, constants, flow control (e.g., "for" construct), the assignment operator, and type definitions).

A declaration node represents the definition of an entity (e.g., a computational construct). The declaration node typically includes an identifier and has multiple children in which its name (e.g., "+"), the namespace in which it occurs (e.g., module), its volatility (e.g., constant or variable) and various other flags are stored as properties. In addition, DCL nodes usually have an outgoing "type" link, which points to a node(s) from which the DCL inherits much of its behavior. Thus, the children define the type and properties of the node. Because EXPR nodes point to the declaration for their operator or operand, the properties of declarations can be changed and be immediately reflected throughout the graph.

A link node represents a link among two or more other nodes (either expression or declaration nodes), and includes identifiers of (e.g., pointers to) these other nodes. In the illustrated example, each link node includes one or more unidirectional links to other node(s). Alternatively, bi-directional links could be used.

The program represented by the example graphs of FIGS. 2–3, is referred to as a "tagged" graph, in which the links of a node are precisely labeled. By way of example, an "if" node of the graph would have three operands, each corresponding to a particular labeled link (e.g., a "condition" link, a "then clause" link, and an "else clause" link). The link labels are illustrated in FIG. 2 along the link from a parent node to a link node (e.g., the label "type" along the link from node 132 to node 144). The link labels in FIG. 3 (as well as FIG. 5) have not been illustrated in order to avoid cluttering the drawings. Alternatively, non-tagged graphs, in which the links of a node are not precisely labeled, can be used with the invention, although this may lead to more rollbacks.

The graphs illustrated in FIGS. 2–3 represent source code that is to be transformed by the compiler. The graph representation of the source code can be generated in any of a wide variety of conventional methodologies. According to one such methodology, the graph is generated directly by a programmer. An example of such a methodology can be found in U.S. Pat. No. 5,790,863, titled "Method and System for Generating and Displaying a Computer Program", to Charles Simonyi. According to another such methodology computer code in a high-level programming language (e.g., C or C++) is passed through conventional lexical and syntactical analysis to generate a syntax tree which is the graphs 130 and 160 of FIGS. 2 and 3.

The program represented by the graphs in FIGS. 2–3 is the following code:

```
EXE Hello_World
{
    print_hello();
}
void print_hello
{
    int i = 10;
    while i-- > 0
        printf ("hello");
}
```

The graph 130 of FIG. 2 represents the program Hello_World, and includes four nodes 132, 134, 136, and 138 linked together as illustrated. Node 132 is a declaration (DCL) node that identifies the program represented by graph 130 and is linked to additional nodes 134 and 136. Node 134 indicates the type of node 132, which is an EXE node in the illustrated example. Node 136 indicates the entry point for the program, and identifies a list of instructions for the program, each instruction being a different node linked to node 136. Node 138 identifies the single instruction (a procedure call labeled "print_hello") that is included in the exemplary program. Graph 130 also includes nodes 140 and 142. Nodes 140 and 142 are not part of the graph 130 initially; rather, they are added to the graph at a later time, as discussed in more detail below.

Each of the nodes 132–142 is linked to another node 132–142 via a link node. For example, link node 144 links together nodes 132 and 134. Each link node includes one "forward" (F) pointer that identifies a node going in one direction (e.g., "forward") through the link node (e.g., going through link node 144 in the forward direction identifies node 134), and one "reverse" (R) pointer that identifies a node in the other direction (e.g., "reverse" or "backwards") through the graph (e.g., going through link node 144 in the reverse direction identifies node 132).

The graph 160 of FIG. 3 represents the "print_hello" procedure of the program Hello_World, and includes thirteen nodes 162–186 linked together by link nodes as illustrated. Node 162 is a DCL node that identifies an entry point for the procedure "print_hello". Node 162 is linked to both node 164, which indicates the type of node 162 (a procedure), and to node 166 which identifies a list of instructions for the program. Each instruction of the print_hello procedure is linked to node 166. Node 168 represents the integer declaration instruction (int i=10), with node 170 identifying the type of node 168 (an integer) and node 172 identifying the initial value assigned to the integer variable (10). Node 174 represents the while instruction (while (i→0) printf ("Hello");). Node 176 represents the condition, with node 178 representing an action to perform (decrementing), node 180 representing the variable to perform it on (i), and node 182 representing the value to compare to (zero). Node 184 represents the body of the while instruction, node 184 represents an instruction in the body (printf), and node 186 represents the data corresponding to the instruction identified by node 184 ("hello").

Each of the nodes 132–138 and 162–186 can have associated therewith one or more question handlers 106. A question handler 106 is a series or set of one or more instructions that is executed in order to respond to a question dispatched by reduction engine 102. This series or set of instructions can include one or more additional questions that need to be answered before a proper response can be given to reduction engine 102. In the illustrated example, each question handler is responsible for responding to only one type of question. Alternatively, a question handler may be programmed to respond to multiple types of questions.

For example, node 166 can have multiple (z) question handlers 188–190 associated with it. Question handler 188 may receive a question of "what is your intermediary language?" from reduction engine 102. In order to respond, the question handler 188 needs the intermediary language from nodes 168 and 174. Thus, the question handler 188 submits questions to reduction engine 102 for the intermediary language for nodes 168 and 174, which in turn dispatches questions to question handlers associated with nodes 168 and 174. Question handler 190 may receive a question of "are you an L-value?" from reduction engine 102, to which question handler 190 is programmed to respond "no".

A question handler for a node is programmed to answer a question that may be dispatched to it from reduction engine 102. The question handler may be programmed with the actual answer, or alternatively with a way to obtain the answer (for example, by submitting a question(s) to reduction engine 102). In the illustrated example, question handlers 106 can communicate with reduction engine 102 via an Application Programming Interface (API) (e.g., API 120 of FIG. 1). An exemplary API and its functions are described in an attached appendix that forms part of this document. Examples of questions that may be asked are listed below in Table I. It is to be appreciated that the grammar of certain "questions" can be changed to make them appear to be statements rather than questions, however, they are still treated as questions within the context of the invention.

TABLE I

| Question |
| --- |
| What is your intermediary language? |
| What is my enclosing control construct(s)? |
| Would you please change yourself to indicate that I am another overloading of you? |
| Are you an L-value? |
| Are you a constant? |
| What code should I run to answer this question? |
| Would you please change yourself to indicate you link to me? |

In the illustrated example, each question handler associated with a node is responsible for responding to only one type of question. For example, if question handlers associated with a node need to be able to respond to each question in Table I, then there would be a different question handler associated with that node for each of the questions in Table I. In submitting a question to reduction engine 102, a question handler 106 provides identifiers of both the node the question is to be directed to as well as what question to ask. Reduction engine 102 uses these identifiers to dispatch a question to the appropriate question handler of the appropriate node.

The intermediary language for a program is generated using this question and answer methodology. In the illustrated implementation no question handler 106 can directly ask a question of another question handler 106. Rather, question handlers 106 receive questions only from reduction engine 102—any questions that need answered by a question handler 106 are submitted to reduction engine 102 for forwarding to the proper question handler 106.

Compiler 100 also supports a form of "transformation" in the graph representing the program. Transformation here refers to using one or more nodes in the graph to represent another node. For example, rather than having a question handler for a particular node generate the intermediary language itself, the question handler can create additional nodes linked to that particular node. Questions can then be dispatched to question handlers corresponding to these additional nodes, the responses therefrom being used by the question handler for that particular node to answer questions it has received.

A question handler 106 can include instructions to add links and/or nodes to the graph as necessary. For example, a question handler 106 may receive a question of "what is your intermediary language?". The question handler 106 responds by generating new nodes that include instructions having a closer direct correspondence to instructions in the intermediary language. The necessary information to generate the new nodes can be obtained, in combination with the programmed instructions in the question handlers 106, from the current nodes in the graph (via questions through reduction engine 102).

For example, if a question handler corresponding to node 174 of FIG. 3 receives the question "what is your intermediary language?", the question handler is programmed to recognize that the "while" instruction is not part of the intermediary language. The question handler thus submits questions to question handlers corresponding to nodes 176 and 184 to determine the information necessary to generate additional nodes. This information is then used to generate "if" and "goto" instructions that accomplish the same function as the while instruction. The "while" instruction is effectively transformed into the following code:

```
LContinue:
    if(i-- > 0)
    {
        printf("hello");
        goto LContinue;
    }
LBreak:
```

The question handler can add nodes and links to the graph by generating a new data structure for the node and asking questions of the new node to add links from it to other nodes. The new node is created by requesting reduction engine 102 to create the node (e.g., via API 120). The question handler can also inform another node in the graph that it is to be linked to the new node by submitting a question (via reduction engine 102) to a question handler corresponding to the other node, the question indicating that the question handler corresponding to the other node is to add an identifier to the other node that it is linked to the newly added node.

Figure 4:
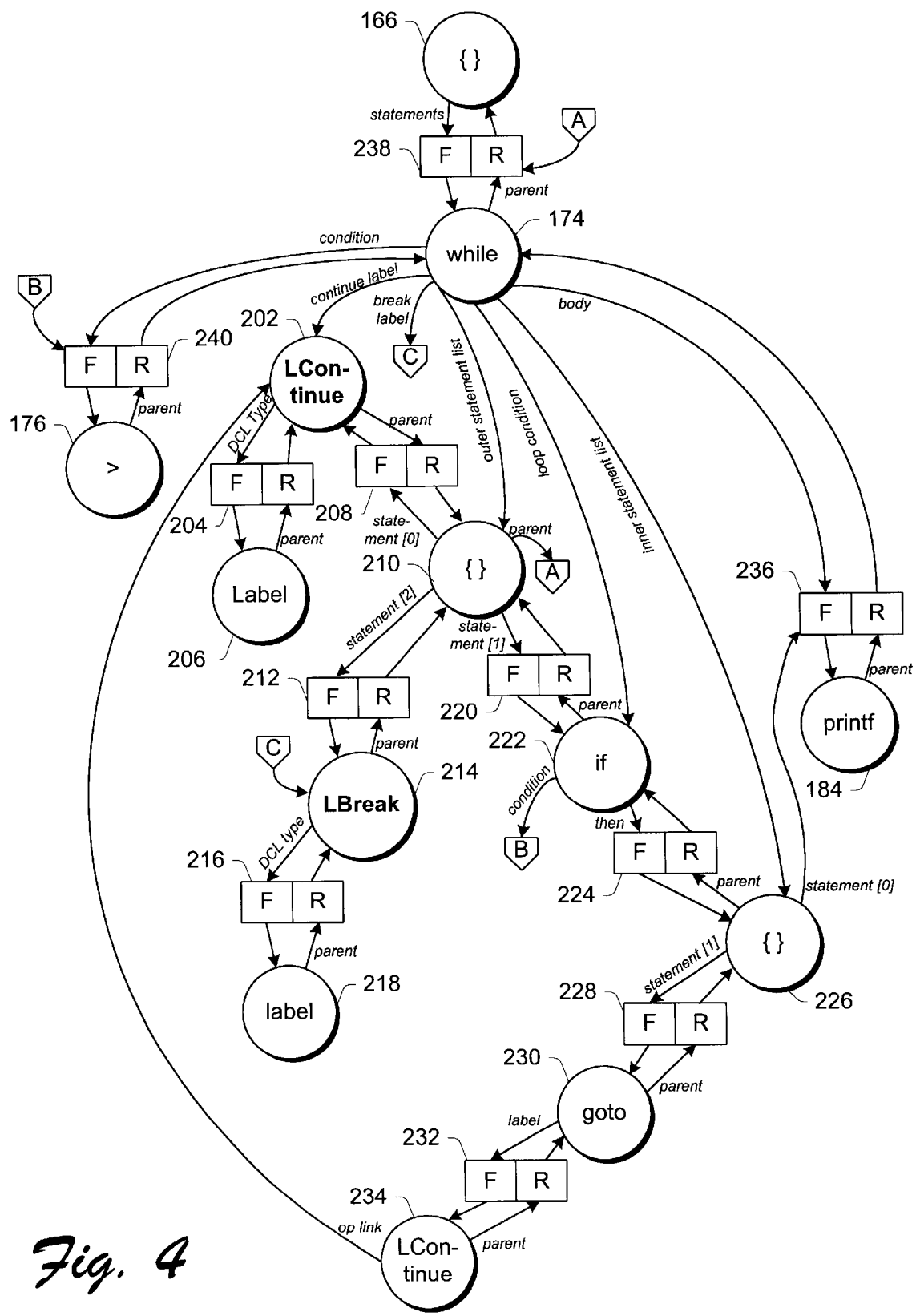
FIGS. 4 and 5 illustrate exemplary additional nodes that can be generated by a question handler.

FIG. 4 illustrates additional nodes 202–234 that are generated by the question handler in this example. A node 210 identifies the beginning of a set of instructions and is linked, via a link node 208, to a node 202 identifying the LContinue label. Node 202 is linked, via a link node 204, to a node 206 representing its type (label). The node 210 is also linked, via link node 212, to a node 214, that in turn is linked, via link node 216, to a node 218 representing the type of node 214 (label). Node 210 is also linked, via link node 220, to node 222 identifying an "if" instruction. Node 222 is further linked, via link node 224, to node 226 identifying a set of instructions. Node 226, in turn, is linked, via node 228, to node 230 identifying a "goto" instruction, which is further linked, via link node 232, to node 234 identifying a destination of the goto instruction. Node 226 is also linked, via link node 236, to node 184, which identifies the action that should occur (printf ("hello")).

Nodes 202–234 are generated by the question handler in this example. However, as illustrated in FIG. 4 they are "integrated" into the existing graph, being linked to multiple pre-existing (not generated by the question handler) nodes in the graph. For example, node 210 is linked, via pre-existing link node 238, to pre-existing nodes 166 and 174. Similarly, node 222 is linked, via pre-existing link node 240, to pre-existing node 176 of FIG. 3, which identifies the condition under which the loop is performed. Furthermore, as illustrated in FIG. 4, no nodes or links in the graph were deleted during the transformation.

Another example of an additional node being generated by a question handler is illustrated in FIG. 2. Upon receiving a "build" or "compile" command (e.g., receiving the question "what is your executable?" from a client 104), a question handler corresponding to node 132 generates a new DCL node 140 identifying a procedure "main", and a new node 142, linked to node 140, identifying the type of node 140 (a procedure), and link nodes 146 and 148. Additional links among nodes 132, 140, 142, 146, 148, and 150 are also added by the question handler, illustrated by dashed lines in FIG. 2. A link from node 140 to the list of instructions identified by node 136 is also added by the question handler. A question handler corresponding to node 140 can then query the question handlers of lower level nodes to obtain the appropriate intermediary language for "Hello_World".

The use of the graphs in FIGS. 2–4 to generate an executable program can be seen in the following example. Assume that a user enters a "build" or "compile" request, such as via a client 104 of FIG. 1. This build request is forwarded by reduction engine 102 to a question handler corresponding to node 132 of FIG. 2, which in turn generates nodes 140 and 142, as well as the link between nodes 132 and 140, the link between nodes 140 and 142, and the link between nodes 140 and 136. The question handler corresponding to node 132 then sends a question to node 140, asking for its intermediary language.

Additional questions asking for intermediary language are then propagated down the tree, with a question handler corresponding to a node submitting such a question to the node(s) it is linked to. For example, a question handler corresponding to node 136 asks a question handler corresponding to node 138 the question "what's your IL?". Similarly, the question handler corresponding to node 138 asks a question handler corresponding to node 162 of FIG. 3 "what's your IL?", the question handler corresponding to node 162 asks a question handler corresponding to node 166 "what's your IL?", and the question handler corresponding to node 166 asks a question handler corresponding to node 168 and a question handler corresponding to node 174 "what's your IL?". Upon receiving the question, the question handler corresponding to node 174 generates the additional nodes illustrated in FIG. 4.

Eventually, question handlers corresponding to the lowest level nodes in the tree (e.g., nodes 170, 172, 180, 182, and 186 of FIG. 3, and nodes 206, 218, and 230 of FIG. 4) will be able to start providing their corresponding intermediary language. This intermediary language is then passed back up through the graph as responses to the previously asked questions. The received intermediary language is then used as necessary by each question handler to generate its intermediary language and respond to the question it was asked. The exact manner in which such intermediary language is used by a question handler is dependent on the programming of the question handler (which in turn is dependent on the particular function or instruction that is intended to be carried out by that node).

Eventually, such responses work their way back up through the graph and provide a response to the initial "what's your IL?" question submitted by the question handler corresponding to node 132. The question handler corresponding to node 132 then forwards the received intermediary language to back end 110, which in turn translates the intermediary language into machine language. This machine language is then returned to the questioning client 104 (either by back end 110 directly or via reduction engine 102), giving the client 104 the executable code it requested.

Many additional questions may also be asked by the question handlers corresponding to the nodes in FIGS. 2–4. These questions are those that are necessary for the question handler to fully answer the question provided to it. For example, in addition to obtaining the intermediary language for a linked to node, additional information such as the type of node it is, whether it is an L-value, whether it is a constant, etc. may be necessary for the question handler to ask.

With the architecture illustrated in FIG. 1, the compiler 100 is easily extensible by various users, whether they be part of the original design team of the compiler or a subsequent user. Such a user can add functionality, such as particular high-level language instructions that he or she wishes to have supported by compiler 100, by adding in the appropriate code that is to be used as the question handlers corresponding to the additional node. As discussed above, an initialization program 111 assigns the appropriate question handlers to the appropriate nodes of the graph. By writing new question handlers to be included in the initialization program 111 and associated with nodes by the initialization program 111, the appropriate question handlers for the new code are made available during compilation. The code written in the question handlers can add additional links and nodes as necessary to obtain the intermediary language for the new instruction. Since no node or links will be deleted, the adding of additional links and nodes can be done without adversely affecting the other nodes and links in the graph.

The following example illustrates the extension of compiler 100. Assume that a particular designer desires to add to compiler 100 a new instruction called Σ having the following format:

Σexpr1[, expr2, expr3 . . . ]

where Σ takes one or more expressions as its operands and evaluates to the sum of these operands. Assuming a binary + operator is available in the intermediary language, or a binary + has been implemented using other primitives in the intermediary language, the user can use this operator to implement the Σ instruction.

Figure 5:
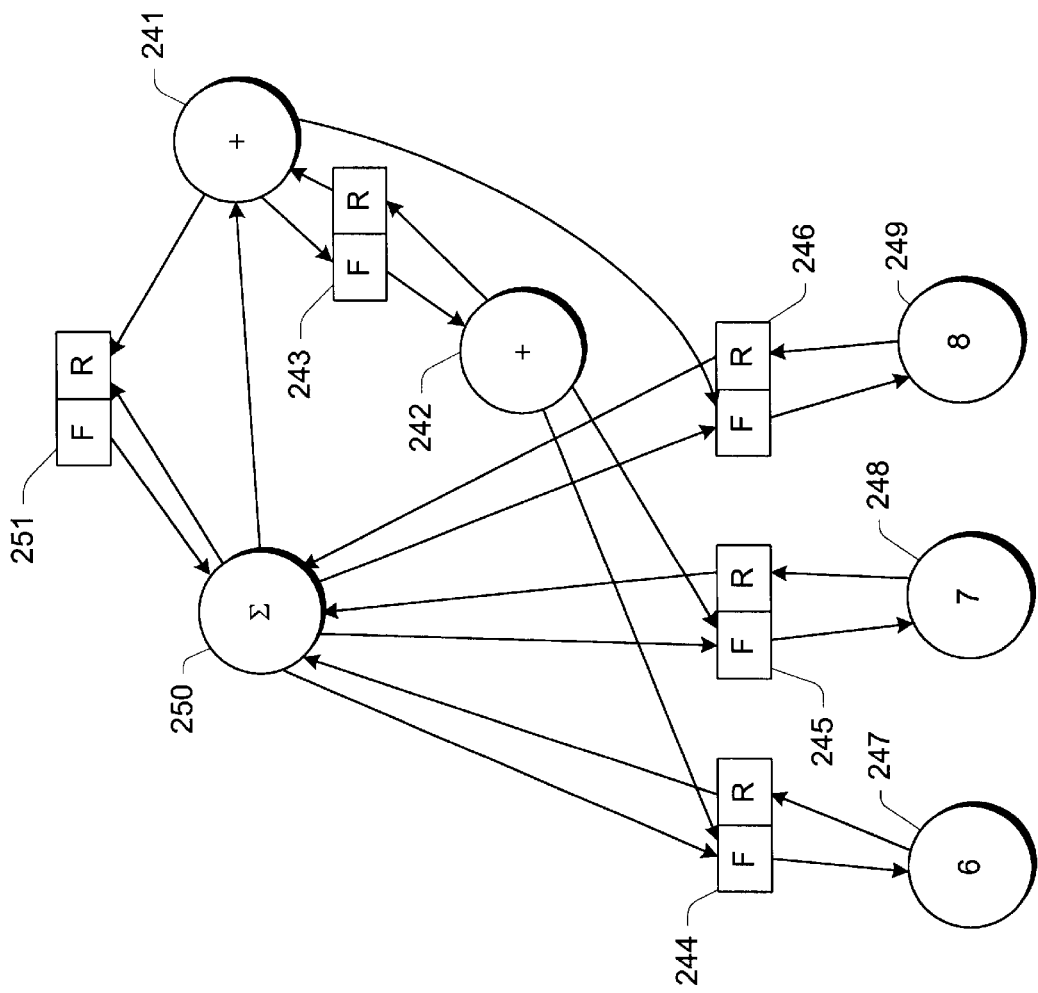

In order to support this new instruction, the user can include a question handler, to be associated with any Σ node, that responds to the question "what is your intermediary language?" by generating new nodes and links that carry out the functionality of the Σ instruction using the binary + operator. FIG. 5 illustrates an example graph of new nodes and links that can be generated by the question handler for the following instruction:

Σ6, 7, 8

This expression is equivalent to the expression "(6+7)+8" so, as FIG. 5 illustrates, two new + nodes 241 and 242 are created. One + node 242 is linked as an operator of the other 241 via a new link 243, and the two + nodes 241 and 242 share the three links 244, 245, and 246 to the three operands 247, 248, and 249 of Σ node 250. The nodes 241–250 are linked to other nodes in the graph, such as via link node 251. Note that the number of + nodes created is dependent on the number of operands of the original Σ. This number, and the manner in which the created nodes are linked together, are determined by the instructions in the question handler for "what is your intermediary language?" associated with the Σ node 250.

Additionally, in one implementation of the invention, a question handler associated with one node can "influence" a question handler associated with another node by adding an "override" tag to the other node. The override tag is a tag in the node's data structure that can be set to indicate that additional code in the form of an additional question handler corresponds to the node and that it is to be executed to respond to a particular question from reduction engine 102. If the particular question is received from reduction engine 102, then the question handler on the node recognizes that the override tag has been set and calls the override handler to handle the questions rather than handling the question itself. In situations where multiple overrides are added to a node, one override handler may declare that it is aware of the other and assume responsibility for handling the code of the other override handler as well. If neither override is aware of the other, the reduction engine cannot know which one is correct and so it will report an error.

Figure 6:
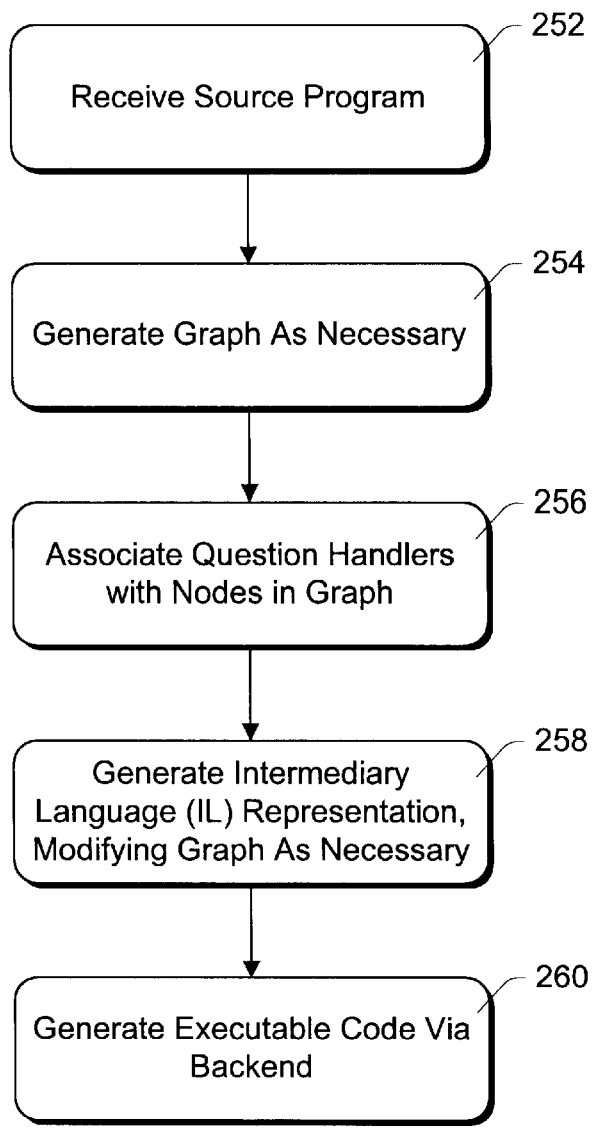
FIG. 6 is a flowchart illustrating exemplary steps in generating executable code by transforming a program using the extensible compiler in accordance with one implementation of the invention.

FIG. 6 is a flowchart illustrating exemplary steps in generating executable code by transforming a program using the extensible compiler in accordance with one implementation of the invention. The steps of FIG. 6 are implemented by compiler 100 of FIG. 1, and may be performed in software. FIG. 6 is described with additional reference to components in FIG. 1.

The source program is received or otherwise made available to compiler 100 (step 252). The graph representing the program is generated as necessary (step 254), and question handlers are associated with the appropriate nodes (step 256). Eventually, a command is received by reduction engine 102 from a client 104 for executable code. In response to the command, reduction engine 102 transforms at least a portion of the program (depending on the nature of the command received) in graph form to the intermediary language. This transformation is carried out via multiple questions, adding to the graph as necessary (step 258). Eventually, the questions and answers lead to a block of intermediary language code that can be understood by the back end 110 (FIG. 1). The block of intermediary language code is provided to the back end to generate executable code (step 260).

Inheritance

Each of the question handlers 106 of FIG. 1 is programmed with instructions to execute or run in order to respond to questions received from reduction engine 102. Each individual question handler 106 can be programmed with the specific code to run, as discussed above. Alternatively, one or more question handlers 106 may "inherit" code (e.g. a set or series of instructions) to run from another question handler.

Such inheritance is accomplished by having associated with a node a "default handler" that takes the place of one or more question handlers corresponding to the node. The default handler is a question handler that submits a question to a question handler of another node asking for code to execute in order to respond to the question. This process can continue through question handlers of multiple other nodes with each of these other question handlers asking another question handler for code that it can execute in order to respond to the question that was submitted to it. Eventually, this process results in code for the original question handler to execute.

Figure 7:
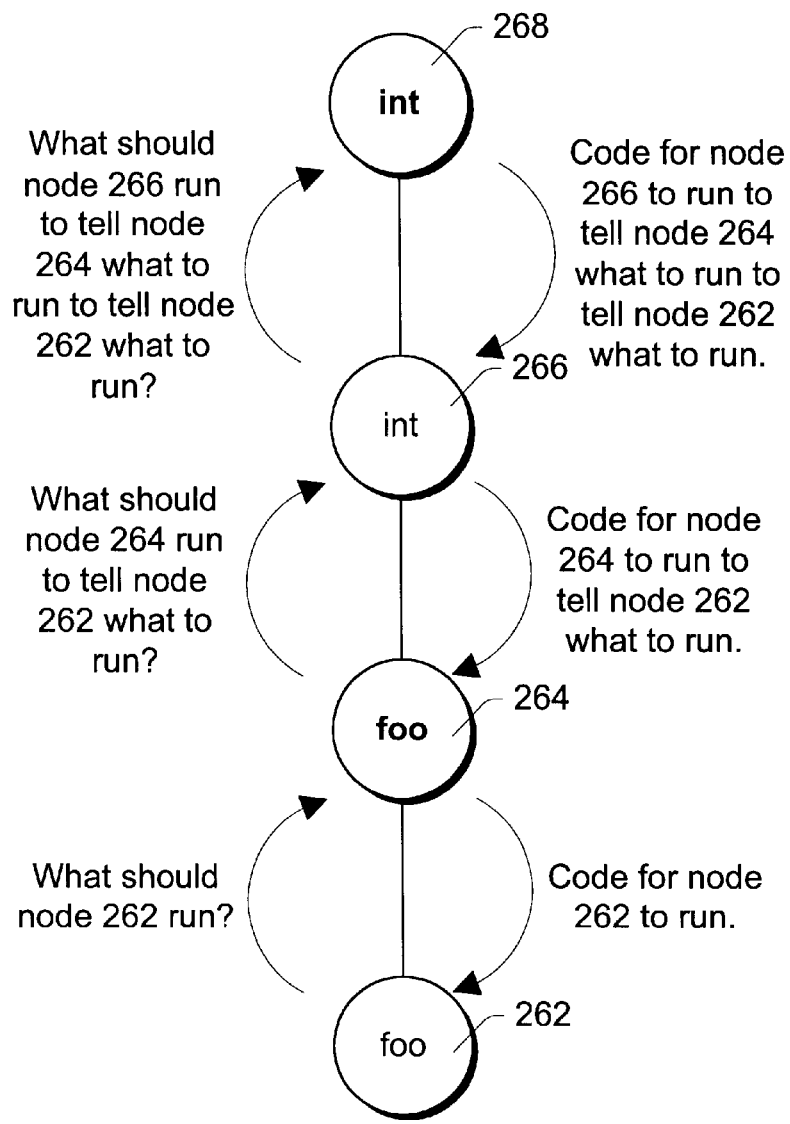
FIG. 7 provides an example of inheritance in accordance with one implementation of the invention.

FIG. 7 provides an example of inheritance in accordance with one implementation of the invention. Each node includes an "op" tag that identifies, directly or indirectly, a declaration node in the graph representing all declarations. This node has a question handler for the "what code should I run?" question which tells the asking declaration to forward the question to its type. In the example of FIG. 7, node 262 asks DCL node 264 the question "what code should I run?". The response is code that is to be executed by the default handler corresponding to node 262. Node 264 answers this question by asking a similar question of node 266, its "type" node, as instructed by the master declaration node. Node 266 answers this question in turn by asking a similar question of DCL node 268, which is the declaration for the "int" abstraction. It is here that an actual question handler (corresponding to node 268) will have been registered, and this handler will return code to node 266 to return code to node 264 to return code to node 262 to answer the question that was asked of it.

In the illustrated example, the default handler includes instructions that cause it, upon receipt of a question, to ask another question of the question handler associated with the node identified by the "op" tag, this other question being "what code should I run to answer this question". Eventually the default handler receives code as a response to its question, and executes the received code. By standardizing the default handler in such a manner, the same default handler can be used for any question on any node—the question that it needs to respond to was identified when it received the question, and the node that the default handler is to submit its question to is identified by the "op" tag.

Additionally, some of the question handlers that respond to default handlers with code to execute support "wildcards". The question handler includes the necessary instructions to execute for any of a family of questions that the question handler may be asked, rather than including code to respond to only a particular question. By being able to respond to an entire family of questions, the question handler is able to respond to the question "what code should I run to answer this question" without regard for what "this question" is.

As discussed above, new question handlers can be registered with the reduction engine, allowing the compiler to be extended. The registering of new question handlers, and thus new questions, is accomplished by submitting additional questions to the reduction engine. When a question is submitted by a question handler to add a new question, a modifier is included as part of the question that identifies the relationship between the generic question (e.g., "what could should I run") and the specific question to which it relates (e.g., "what is your type?"). For example, to add a new question of "what could should I run to answer the question 'what is your type?'?", an API call is made to the reduction engine in the form of "I would like to register another question which has a 'what could should I run to answer a question' relationship with the 'what is your type?' question?". By generating such a relationship, the default handler knows what question to submit to the reduction engine when it wants to ask "what could should I run to answer the question 'what is your type?'?".

By using inheritance, the particular code that a question handler should run is obtained from a declaration node corresponding to the node. Multiple nodes within the graph can similarly obtain that same code from the declaration node, thereby alleviating the need for that code to be written into a handler for each such node. Rather, only the default handler need be included. By way of example, multiple "int" nodes can include a default handler that accesses declaration node 266 (either directly, via node 264, or via some other node(s)), asking "what code should I run to respond to 'what is your intermediary language?'?"

Furthermore, the response from declaration node 266 can be cached by reduction engine 102, so subsequent questions can be immediately answered by reduction engine 102 without requiring dispatch of the question to a question handler associated with declaration node 266.

In the illustrated example, each node in the graph is not more than a threshold number of "uplinks" away from a declaration node from which code can be inherited. According to one implementation, this threshold number of uplinks is two. Alternatively, different threshold numbers could be used.

Additionally, in the illustrated example, default handlers are question-specific. In other words, each question that can be asked has a corresponding default handler. Alternatively, multiple questions may be handled by a single question handler, with the default handler obtaining code from the question handler corresponding to the declaration node for each of these multiple questions.

Exemplary Computer Environment

FIG. 8 shows a general example of a computer that can be used to run compiler 100 of FIG. 1. The compiler 100, clients 104, and question handlers 106 of FIG. 1 can be stored, at different times, in any of the various memories and storage devices of computer 300 illustrated in FIG. 8.

Computer 300 includes one or more processors or processing units 302, a system memory 304, and a system bus 306 that couples various system components including the system memory 304 to processors 302. The system bus 306 may be any of several types of bus structures including a memory bus or memory controller, a peripheral bus, and a local bus using any of a variety of bus architectures. The system memory includes read only memory (ROM) 308 and random access memory (RAM) 310. A basic input/output system (BIOS) 312, containing the basic routines that help to transfer information between elements within computer 300, such as during start-up, is stored in ROM 308.

Computer 300 further includes a hard disk drive 314 for reading from and writing to a hard disk, not shown, a magnetic disk drive 316 for reading from and writing to a removable magnetic disk 318, and an optical disk drive 320 for reading from or writing to a removable optical disk 322 such as a CD ROM or other optical media. The hard disk drive 314, magnetic disk drive 316, and optical disk drive 320 are connected to the system bus 306 by an SCSI interface 324 or some other appropriate interface. The drives and their associated computer-readable media provide non-volatile storage of computer readable instructions, data structures, program modules and other data for computer 300. Although the exemplary environment described herein employs a hard disk, a removable magnetic disk 318 and a removable optical disk 322, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 318, optical disk 322, ROM 308, or RAM 310, including an operating system 328, one or more application programs 330, other program modules 332, and program data 334. A user may enter commands and information into computer 300 through input devices such as keyboard 336 and pointing device 338. Other input devices (not shown) may include a microphone, joystick, game pad, satellite dish, scanner, or the like. These and other input devices are connected to the processing unit 302 through an interface 340 that is coupled to the system bus. A monitor 342 or other type of display device is also connected to the system bus 306 via an interface, such as a video adapter 344. In addition to the monitor, personal computers typically include other peripheral output devices (not shown) such as speakers and printers.

Computer 300 operates in a networked environment using logical connections to one or more remote computers, such as a remote computer 346. The remote computer 346 may be another personal computer, a server, a router, a network PC, a peer device or other common network node, and typically includes many or all of the elements described above relative to computer 300, although only a memory storage device 348 has been illustrated in FIG. 8. The logical connections depicted in FIG. 8 include a local area network (LAN) 350 and a wide area network (WAN) 352. Such networking environments are commonplace in offices, enterprise-wide computer networks, intranets, and the Internet. In the described embodiment of the invention, remote computer 346 executes an Internet Web browser program such as the "Internet Explorer" Web browser manufactured and distributed by Microsoft Corporation of Redmond, Wash.

When used in a LAN networking environment, computer 300 is connected to the local network 350 through a network interface or adapter 354. When used in a WAN networking environment, computer 300 typically includes a modem 356 or other means for establishing communications over the wide area network 352, such as the Internet. The modem 356, which may be internal or external, is connected to the system bus 306 via a serial port interface 326. In a networked environment, program modules depicted relative to the personal computer 300, or portions thereof, may be stored in the remote memory storage device. It will be appreciated that the network connections shown are exemplary and other means of establishing a communications link between the computers may be used.

Generally, the data processors of computer 300 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

The invention provides for an extensible compiler architecture. The compiler architecture includes a reduction engine that communicates with multiple question handlers corresponding to nodes of a graph representing the program being compiled. All communication between the reduction engine and the question handlers is carried out using a question and answer methodology. The program in graph form is transformed into another (e.g., a lower-level) language by repeatedly asking questions of the question handlers corresponding to the nodes (e.g., what is your lower-level code). Additional functionality can advantageously be added by users by adding in the appropriate question handlers for the new functionality, allowing them to easily specialize a compiler to their particular needs. Additionally, a question handler can add links and/or nodes to a graph, but cannot delete them, thereby alleviating the reduction engine of the burden of determining a particular order that questions should be dispatched in (e.g., whether a question has to be dispatched before or after another question deletes a node or link in the graph).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

APPENDIX

/* Basic Node Functions */ typedef_size(4) OPAQUE_TYPE HTE5; /* HTE5 is a handle to a graph node (also referred to as "tree element"). OPAQUE_TYPE means the implementation is hidden from the user. */ inline const_TypeVar hteNil5=_hteNil5( ); /* The NIL value for HTE5 is hteNil5. */ FLAG FNilHte5(HTE5 hte); /* hteNil5 is the NIL value for the type HTE5, in the same way that NULL is for pointer types. It is implemented as a function call, but it can be thought of as a constant. In general, when a function optionally returns a value of a given type, a specific and recognizable value is returned that is special and indicates that there is no value to be returned. FnilHte5 (hteFoo) tests whether hteFoo is nil.

FLAG FEqHte5
    FLAG FEqHte5(HTE5 hteL, HTE5 hteR);
    This function tests whether two handles to graph nodes, identified by HTE5 hteL and HTE5 hteR, are equivalent. The function returns a value of True if the two handles are equivalent, otherwise returns a value of False.

HTE5 HteThis5
    This method returns a handle to the graph node that the currently executing question handler is associated with.
    HTE5 HteThis5( );
    typedef HTE5 HDCL5; /* A declaration node, once it is known that it is a declaration node, is referred to with "HDCL5" rather than "HTE5". */ inline const_TypeVar hdclNil5=hteNil5; /* The NIL value for HDCL5 is hdclNil5. */ typedef HDCL5 HTAG5; /* When a declaration node is being used as a tag, it is referred to as "HTAG5" rather than "HDCL5". */ inline const_TypeVar htagNil5=hdclNil5; /* The NIL value for HTAG5 is htagNil5. */

HTE5 HteCreate5

This function is used to create an HTE5. The created node is blank—it has no links or binary information.

HTE5 HteCreate5( );

SetConstHtag5

This function is used to write binary information on a node of the graph.

```
void SetConstHtag5(
    HTAG5 htag,
    CB cb,
    In in_length(cb) PV pvData
);
```

Parameters

HTAG5 htag,

An identifier of the tag on the node to which the binary data is going to be written.

CB cb,

Indicates how much data is going to be written.

In in_length(cb) PV pvData

A pointer to a buffer containing cb bytes from which to copy the data to be written.

Return Values

None.

CbGetConstHtag5

This function is used to read binary information on a node of the graph.

```
CB CbGetConstHtag5(
    HTAG5 htag,
    Optional CB cbMax,
    Out Optional in_length (cbMax) out_length(cbRetVal min cbMax)
    PV pvData
);
```

Parameters

HTAG5 htag,

An identifier of the tag on the node from which the binary data is going to be read.

Optional CB cbMax,

Specifies the maximum number of bytes the buffer into which the data will be copied can hold. This parameter is optional, and may be omitted if and only if pvData is omitted.

Out Optional in_length (cbMax) out_length(cbRetVal min cbMax) PV pvData

A pointer to a buffer into which the data is to be copied. This parameter is optional, and may be omitted if and only if cbMax is omitted. If present, the buffer is filled in on return with a number of bytes which is the lesser of cbMax and the return value.

Return Values

The number of bytes in the tag. When cbMax is present, this may be more than cbMax.

```
/* Tag Enumeration */
typedef_implementation(UINT_) enum KTAG5
{
    ktagTe5 = 0,/* corresponds to ktagrSingletonTe5 or ktagrFlexibleTe5 */
    ktagBinary5 = 1/* corresponds to ktagrBinary5 */
};
```

Kind of TAG

A given HTAG5 can only be used for one kind of information wherever it is used.

ktagTe means that the tag is for LNK5s to HTE5s.

ktagBin means that the tag is for binary information.

typedef_size(12) OPAQUE_TYPE ENTAG5; /* Enumeration state for enumerating over all HTAG5s of a given KTAG5 on HteThis5( ) */

InitEntag5

This function initializes an ENTAG5 for enumerating the tags of KTAG5 ktag on HteThis5( ).

```
void InitEntag5(
    ENTAG5* pentag,
    KTAG5 ktag
);
```

Parameters

ENTAG5* pentag,

A pointer to enumeration state. This is an output—i.e. the user will pass a pointer to an uninitialized ENTAG, and this function will initialize it.

KTAG5 ktag

Kind of tags to enumerate.

Return Values

None.

HtagNext5

This function returns the next tag in the enumeration. The tags are not returned in any particular order, but each will only be returned once.

HTAG5 HtagNext5(ENTAG5* pentag);

Parameters

ENTAG5* pentag

A pointer to enumeration state.

Return Values

An identifier of the next tag in the enumeration. May be htagNil5 if there are no more tags to be enumerated.

FHtagExists5

This method checks whether there is information (one or more links to other nodes, or binary data) under an identified tag on hteThis.

FLAG FHtagExists5(HTAG5 htag);

Parameters

HTAG5 htag

An identifier of a tag on a node.

Return Values

Returns a value of True if there is information under the tag, otherwise returns False. If htag is of type ktagTe5, there are one or more links to other nodes under that htag. If it is of type ktagBinary5, there is a chunk of binary data under that tag.

/* APIs on links: */
typedef_size(8) OPAQUE_TYPE LINK5;/* Link descriptor for extant links */

HtePointedToFromLink5
   HTE5 HtePointedToFromLink5(LINK5 link);
   This function identifies the node of the graph to which a link, identified by LINK5 link, points to.

HtagFromLink5
   HTAG5 HtagFromLink5(LINK5 link);
   This function identifies what node tag the link, identified by LINK5 link, is under on hteThis. It is an error if it is not under any tag.
   FLAG FNilLink5(LINK5 link);
      inline const_TypeVar linkNil5=_linkNil5( ); /* The NIL value for LINK5 is linkNil5—linkNil5 should be treated as a constant. */
   FLAG FEqLink5(LINK5 linkL, LINK5 linkR); /*
   This function tests whether two handles to links nodes, identified by Link5 linkL and Link5 linkR, are equivalent. The function returns a value of True if the two handles are equivalent, otherwise returns a value of False.

FLinkPointsToMe5
   FLAG FLinkPointsToMe5(LINK5 link);
   This function checks whether a given link, identified by Link5 link, points to hteThis.
   The function returns a value of True if the link points to hteThis, and otherwise returns a value of False.

LinkInvert5
   LINK5 LinkInvert5(LINK5 link);
   This function returns a link that points in the opposite direction of a given link identified by Link5 link. The function returns a link similar to the given link, except that the returned link points to the node that the given link points from, and also points from the node that the given link points to.

FBidirectionalLink5
   FLAG FBidirectionalLink5(LINK5 link);
   This function checks whether a link is a descriptor of a bi-directional link node. The function returns a value of True if the links is a descriptor of a bi-direcitonal link node, and otherwise returns a value of False.
   UTID UtidOfDcl5( ); /* A UTID is a Universal TE ID associated with each DCL. */

```
/* APIs for ktagTe5 tags: */
/* Kind of Insert Link
*/ typedef enum KIL
{
   kilShare,
   kilReflect
};
/* Kind of Insert At End
*/ typedef enum KIAE
{
   kiaeFirst,
   kiaeLast
};
/* Kind of Insert Next To
*/ typedef enum KINT
{
   kintBefore,
   kintAfter
};
```

```
/* Kind of Insert TE
*/ typedef enum KIT
{
   kitUnidirectional,
   kitBidirectional
};
```

/* The following APIs return a LINK5 describing the link that was just created. Links can be bidirectional, so that an intention can potentially see which intention is asking it a question (if it has a bidirectional link back to the asking intention and the question was asked down that link). So, given a LINK5, one can "invert" it and attach the other end to the "this" node. Or, one can create a new link to an HTE5. For example, if node A creates a bidirectional link L to B in A's tag T, that creates a link node N with two outgoing, labeled, pointers. The "forwards" direction points to B and the "backwards" direction points to A. It also adds L,(which is a handle to N with a note to use the forwards direction), to A's tag T. Note that B has not been given a link to A. A then tells B, via, say AskQuestionLink5( . . . , L , . . . ), to make a note that A has done this. When B handles the question, the link it receives, M, is simply N with a note to use the backwards direction. B then uses one of the LinkInsertLink . . . APIs above to add M to itself in the appropriate place, with kilShare.*/
   LINK5 LinkInsertLinkAtEndHtag5(HTAG5 htag, KIL kil, KIAE kiae, LINK5 link); LINK5 LinkInsertLinkNextToLink5(LINK5 linkNextTo, KIL kil, KINT kint, LINK5 link);
   LINK5 LinkInsertTeAtEndHtag5(HTAG5 htag, KIT kit, KIAE kiae, HTE5 hteTo); LINK5 LinkInsertTeNextToLink5(LINK5 linkNextTo, KIT kit, KINT kint, HTE5 hteTo);
   /* APIs Enumerating links within a ktagTe5 tag. */
   typedef_size(8) OPAQUE_TYPE ENLINK; /* Enumeration state for enumerating the LINK5s in a ktagTe5 tag on HteThis5( ) */

InitEnlinkFromHtag5
   void InitEnlinkFromHtag5(HTAG5 htag, Out ENLINK* penlink);
   This function initializes an enumeration state penlink for enumerating the LINK5s within htag on HteThis5( ) from either end.

InitEnlinkFromLink5
   void InitEnlinkFromLink5(LINK5 link, Out ENLINK* penlink);
   This function initializes an enumeration state penlink for enumerating the LINK5s within the tag HtagFromLink5 (link) on HteThis5( ) from link.

FGetNextLink5
   FLAG FGetNextLink5(In Out ENLINK* penlink, Out LINK5* plink);
   This function obtains the next link in the enumeration. It initializes an output link from a tag, identified by HTAG5 htag. penlink is "In Out" because this function reads the ENLINK passed in, and then modifies it to reflect the change to the enumeration state (i.e. it's now at the next link). plink is a pointer to an uninitialized link—this function then writes a valid link into this location. The function returns a value of True if it successful in initializing the output link, and otherwise returns a value of False.

FGetPrevLink5

FLAG FGetPrevLink5(In Out ENLINK* penlink, Out LINK5* plink);

This function obtains the previous link in the enumeration. It initializes an output link from a tag, identified by HTAG5 htag. The function reads the ENLINK passed in, and then modifies it to reflect the change in enumberation state (i.e. it's now at the previous link). plink is a pointer to an uninitialized link—this function then writes a valid link into this location. The function returns a value of True if it successful in initializing the output link, and otherwise returns a value of False.

The above four functions obey the following algebraic law:

Next(Prev(link))=Prev(Next(link))=link

Conceptually, there's a single linkNil5 before the beginning of the contents of the tag and after the end. InitEnlinkFromHtag5 has the enumeration state "pointing" to this linkNil5. Next moves this to the first link in the tag, and Prev moves it to the last. Prev, when the enumeration state is on the first link in the tag, moves the state to nil link state. Similarly for Next and the last link in the tag. InitEnlinkFromLink5 has the enumeration state "pointing" to the given link; Next yields the link after that link, and Prev the link before that link.

HDCL5 HdclQuote5(In_TypeVar<NAME>) /* HdclQuote5 is an operator, not a function or procedure—it is parameterized with a reference to a DCL, and returns a handle to that DCL. */

The following four APIs are "loop-like" macros to iterate through links and nodes. They are implemented with calls to some of the iteration APIs listed earlier. The "stmtlike" annotation means that the last argument should be displayed on a new line, and indented, instead of inside the parenthesis. For example, a call might look like this:

```
ForAllTeInTagLToR5(tagStmt, hte)
    PrintNameOfTe(hte);
stmtlike void ForAllLinkInTagLToR5(_TypeVar <TAG>,LINK5 link,_
TypeVar_stmt_)
stmtlike void ForAllLinkInTagRToL5(_TypeVar <TAG>,LINK5 link,_
TypeVar_stmt_)
stmtlike void ForAllTeInTagLToR5(_TypeVar <TAG>,HTE5 hte,_
TypeVar_stmt_)
stmtlike void ForAllTeInTagRToL5(_TypeVar <TAG>,HTE5 hte,_
TypeVar_stmt_)
/* Tag Registration. Allows new tags for nodes to be registered. */
/* Kind of TAG Registration */
typedef_implementation(UINT_) enum KTAGR5
{
/* The non-flexible registration is optional, but it means that the system
does not allow an improper binary or flexible registration.
*/ ktagrSingletonTe5 = 0,
  ktagrFlexibleTe5 = 1,
  ktagrBinary5 = 2
};
``` ktagrSingletonTe5 indicates a ktagTe5 tag that can contain at most 1 LINK5.

ktagrFlexibleTe5 indicates a ktagTe5 tag that can contain any number of LINK5s. ktagrBinary5 indicates a ktagBin5 tag.

RegisterTagUtid void RegisterTagUtid(UTID utidTag, KTAGR5 ktagr);

This function registers a tag that can be on HTE5s as being of type ktagr. UTID utidTag is a Universal TE ID for the new tag. ktagr is the kind of tag being registered, from the KTAGR5 enumeration just above.

/* Questions */
typedef OPAQUE_TYPE(_UNSPEC*)) HQUESTION5; inline const HQUESTION5 hquestionNil5=(HQUESTION5)pNil_;

/* An HQUESTION5 is returned by the APIs below, and used for both asking and registering Questions. For the notation <ClForRefFor<FFoo>>, the things in brackets are HQUESTION5s. The overall term "<ClForRefFor<FFoo>>" is one HQUESTION5, but the notation indicates that it has a special relationship to the HQUESTION5 "<FFoo>".

typedef void (* PfnQuestion5)(HQUESTION5 hquestion, In LINK5 linkAsking, In PV pvParamsIn, Out PV pvParamsOut);

The instructions that make up a question handler must be written in a procedure with the above formals and return type. PfnQuestion5 is a pointer to such a procedure.

/* Inheritance */

HquestionFromQuestion5

HQUESTION5 HquestionFromQuestion5(In_TypeVar<QUESTION>)

This function converts a reference to a question DCL to an HQUESTION5. Similar to HdclQuote5. HquestionFromQuestion(FFoo) returns the HQUESTION5 for <FFoo>.

inline const UTID utidAnyIntention=utidNil; /* The UTID for the special AnyIntention identifier. */ inline const UTID utidAnyQuestion=utidNil; /* The UTID for the special AnyQuestion identifier. */

HquestionAny5

HQUESTION5 HquestionAny5( )

This function returns the HQUESTION5 for <AnyQuestion>.

HquestionFromHquestionParish5

HQUESTION5 HquestionFromHquestionParish5 (HQUESTION5 hquestion,_TypeVar <PARISH>)

This function returns the HQUESTION5 for a modified question (actually creates an object for the QUESTION if it didn't already exist). For example, HquestionFromHquestionParish(HquestionFromQuestion5 (FFoo), ClForRefFor) returns an HQUESTION5 for <ClForRefFor<FFoo>>.

HquestionWildcardFromHquestionWildcardParish5

HQUESTION5 HquestionWildcardFromHquestionWildcardParish5 (HQUESTION5 hquestion,_TypeVar<PARISH>)

This function returns the HQUESTION5 for a modified quesiton using wildcards. The function searches for a wildcard match. In searching for a handler for an HQUESTION5 on an HTE5, exact matches are preferred to wildcard matches and more exact wildcards are preferred to less exact wildcards. So in looking up the question <ClForRefFOr<ClForDclOfThisType<ClForRefFor<Foo>>> on an HTE5, the function looks for handlers in the following order of preference, highest preference first:

<ClForRefFOr<ClForDclOfThisType<ClForRefFor<Foo>>>>

<ClForRefFOr<ClForDclOfThisType<ClForRefFor<X>>>>

<ClForRefFOr<ClForDclOfThisType<X>>>

<ClForRefFOr<X>>

<X>

RegisterQuestionUtid5 void RegisterQuestionUtid5(HQUESTION5 hquestion, UTID utidIntention, PfnQuestion5 pfnQuestion, ILOAD iload);

This function is used to register a question handler on a particular DCL node.

HQUESTION5 hquestion is an identifier of the question handler, UTID utidIntention is the UTID of the DCL node the question handler is being registered with, PfnQuestion5 pfnQuestion is a pointer to the instructions that make up the question handler, and ILOAD iload is an identifier of a DLL where the instructions that make up the question handler reside.

UnregisterQuestionsForIload void UnregisterQuestionsForIload(ILOAD iload);

This function removes the registrations for everything that was registered under the DLL identified by ILOAD iload. Used when the DLL identified by ILOAD iload is unloaded from the system.

/* Defaulting */ void AskDefault( );

This function calls the default handler for the question being handled. A default handler is registered by calling RegisterQuestionUtid5 with the UTID utidAnyIntention.

/* Closures */ typedef_size(8) OPAQUE_TYPE CL;
   typedef CL* PCL;

A closure (CL) is a data structure containing a pointer to a function and some parameters which are to be passed to that function.

typedef void (* PfnClosure5)(HQUESTION5 hquestion, In LINK5 linkAsking, In PV pvEnvironment, In PV pvParamsIn, Out PV pvParamsOut);

The instructions that make up a closure function must be written in a procedure with the above formals and return type. PfnClosure5 is a pointer to such a procedure.

void ClNew5(Out PCL pcl, PfuClosure5 pfnClosure, CB cb, in_length(cb) PV pvEnvironment);

Creates a new closure, and returns it in *pcl. pfnClosure specifies the closure function, cb is the number of bytes in the parameters that are to be passed to the closure function, and pvEnvironment points to a contiguous range of bytes that is to be passed to the closure function.

void CallAndDestroyCl5(In PCL pcl, HQUESTION5 hquestion, In LINK5 linkAsking, In PV pvParamsIn, Out PV pvParamsOut);

Calls the function in a closure, passing it the parameters that are stored in the closure, as well as the parameters pointed to by pvParamsIn. The output of the closure function will be stored in the buffer pointed to by pvParamsOut. A closure can only be called once.

/* Standard Question Modifiers */

The following are declarations for standard modifiers that can be used with questions. They are declared as procedures to document the type of the modified question. The modified questions will take no input parameters, and will return a single output result: a closure.

NoExport void ClForRefFor(HQUESTION5 hquestion, Out PCL pcl);

NoExport void ClForDclOThisTypeFor(HQUESTION5 hquestion, Out PCL pcl);

NoExport void ClForTypeDclDerivedFromThisTypeFor (HQUESTION5 hquestion, Out PCL pcl);

/* Questions */

HsqSubmitQuestionTe5

This method is used by a question handler to submit a question to the reduction engine that targets a particular node of the graph.

```
HSQ HsqSubmitQuestionTe5(
    HQUESTION5 hquestion,
    HTE5 hteAsked,
    In Optional LINK5 linkAsking,
    CB cbIn,
    in_length(cbIn) In PV pvParamsIn,
    CB cbOut
);
```

Parameters

HQUESTION5 hquestion

The question that is being asked.

HTE5 hteAsked

A handle to the node that the question is targeting.

In Optional LINK5 linkAsking

An identifier of the link between the node asking the question and the node that the question is targeting. This parameter is optional.

CB cbIn

A count of the number of bytes in the input block (described below).

in_length(cbIn) In PV pvParamsIn

A pointer to an input block (a contiguous range of bytes).

CB cbOut

A count of the number of bytes in the output block.

Return Values

A Handle To A Submitted Question. This is passed to WaitForQuestion5 (described below).

HSQ HsqSubmitQuestionLink5

This method is used by a question handler to submit a question to the reduction engine that targets a node of the graph coupled to the current node via a particular link, without requiring a handle to the targeted node.

```
HSQ HsqSubmitQuestionLink5(
    HQUESTION5 hquestion,
    LINK5 linkAsked,
    CB_cbIn,
    in_length(cbIn) In PV pvParamsIn,
    CB cbOut
);
```

Parameters

HQUESTION5 hquestion

The question that is being asked.

LINK5 linkAsked,

An identifier of the link from the node asking the question to the node that the question is targeting.

CB cbIn

A count of the number of bytes in the input block (described below).

in_length(cbIn) In PV pvParamsIn

A pointer to an input block (a contiguous range of bytes).

CB cbOut

A count of the number of bytes in the output block.

Return Values

A Handle To A Submitted Question. This is passed to WaitForQuestion5 (described below).

WaitForQuestion5

This method is used by a question handler to inform the reduction engine that the question handler cannot proceed with executing its instructions until it receives a response to the identified question.

```
void WaitForQuestion5( HSQ hsq, Out PV pvParamsOut
);
```

Parameters

HSQ hsq,

A handle to a previously submitted question

Out PV pvParamsOut

A pointer to a buffer into which the results of the question will be written.

Return Values

None.

Void AskQuestionTe5

This method is used by a question handler to simultaneously submit a question to the reduction engine that targets a particular node of the graph and inform the reduction engine that the question handler cannot proceed with executing its instructions until it receives a response to the question. AskQuestionTe5 combines the functionality of the HsqSubmitQuestionTe5 and WaitForQuestion5 calls above.

```
void AskQuestionTe5(
    HQUESTION5 hquestion,
    HTE5 hteAsked,
    In Optional LINK5 linkAsking,
    in_length(cbIn) In CB cbAsking,
    In PV pvParamsIn,
    CB cbOut,
    out_length(cbOut) Out PV pvParamsOut
);
```

Parameters

HQUESTION5 hquestion

The question that is being asked.

HTE5 hteAsked

A handle to the node that the question is targeting.

In Optional LINK5 linkAsking

An identifier of the link between the node asking the question and the node that the question is targeting. This parameter is optional.

In CB cbIn

A count of the number of bytes in the input block (described below).

in_length(cbIn) In PV pvParamsIn,

A pointer to an input block (a contiguous range of bytes).

Out CB cbOut

A count of the number of bytes in the output block.

out_length(cbOut) Out PV pvParamsOut

A pointer to a buffer into which the results of the question will be written.

Return Values

None.

Void AskQuestionLink5

This method is used by a question handler to simultaneously submit a question to the reduction engine that targets a node of the graph coupled to the current node via a particular link, without requiring a handle to the targeted node, and inform the reduction engine that the question handler cannot proceed with executing its instructions until it receives a response to the question. AskQuestionLink5 combines the functionality of the HsqSubmitQuestionLink5 and WaitForQuestion5 calls above.

```
void AskQuestionLink5(
    HQUESTION5 hquestion,
    In LINK5 linkAsked,
    in_length(cbIn) In CB cbAsking,
    In PV pvParamsIn,
    CB cbOut,
    out_length(cbOut) Out PV pvParamsOut);
```

Parameters

HQUESTION5 hquestion

The question that is being asked.

In LINK5 linkAsked,

An identifier of the link between the node asking the question and the node that the question is targeting.

In CB cbIn

A count of the number of bytes in the input block (described below).

in_length(cbIn) In PV pvParamsIn,

A pointer to an input block (a contiguous range of bytes).

Out CB cbOut

A count of the number of bytes in the output block.

out_length(cbOut) Out PV pvParamsOut

A pointer to a buffer into which the results of the question will be written.

Return Values

None.

Void AskQuestionMapTag5

This method is used by a question handler to ask the same question of all nodes linked to the current node without discovering how many nodes are linked to the current node.

```
void AskQuestionMapTag5(
    HQUESTION5 hquestion,
    HTAG5 htag
);
```

Parameters

HQUESTION5 hquestion

The question that is being asked.

HTAG5 htag

A handle to a tag.

The question API should probably come after the tree API, in which case delete the bracketed text.

Return Values

None.

Void Influence5

This method is used by a question handler running for one HTE5 to change the behavior of another HTE5.

```
void Influence5(
    HTE5 hte,
    HQUESTION5 hquestion,
    PfnQuestion5 pfnQuestionInfluence,
    PRIV priv
);
```

Parameters
    HTE5 hte
        A handle to the node whose corresponding question handler is going to be influenced.
    HQUESTION5 hquestion
        The question for which the handler is being replaced.
    PfnQuestion5 pfnQuestionInfluence,
        A pointer to the function to be executed as the new question handler.
    PRIV priv
        A privilege block that lets existing question handlers be overridden by claiming
    knowledge of the question handlers being replaced.

What is claimed is:

1. A method comprising:
    associating one or more question handlers with each of a plurality of nodes of a graph representing a program, the plurality of nodes being interconnected via a plurality of links; and
    transforming the program into a desired output by submitting a plurality of questions to a plurality of question handlers corresponding to the plurality of nodes, wherein the transforming comprises communicating information between the plurality of question handlers by submitting questions and receiving responses between one another.

2. A method as recited in claim 1, wherein the desired output comprises another language.

3. A method as recited in claim 1, further comprising initiating the transforming in response to a question from a client.

4. A method as recited in claim 1, wherein the transforming comprises transforming nodes only in response to questions being submitted to them.

5. A method as recited in claim 1, wherein the transforming comprises communicating questions and responses via a reduction engine.

6. A method as recited in claim 5, wherein a subset of the questions comprises questions requesting code in another language.

7. A method as recited in claim 1, wherein the transforming comprises generating additional nodes to add to the plurality of nodes in order to produce the desired output.

8. A method as recited in claim 1, further comprising adding an additional question handler to a node to replace a current question handler corresponding to the node.

9. A method as recited in claim 1, wherein each of the plurality of question handlers, in submitting a questions, requests only information needed by the question handler.

10. At least one computer-readable memory containing a computer program that is executable by a processor to perform the method recited in claim 1.

11. At least one computer-readable media having stored thereon a computer program that, when executed by one or more processors, causes the one or more processors to perform functions to transform a program into an intermediary language, the functions including:
    receiving questions from a plurality of question handlers corresponding to nodes of a graph representing the program, wherein the questions comprise requests for intermediary language corresponding to the nodes;
    dispatching the questions to selected ones of the plurality of question handlers;
    receiving responses to the questions from the selected ones of the plurality of question handlers; and
    providing the responses to the question handlers from which the questions were received.

12. At least one computer-readable media as recited in claim 11, further comprising:
    detecting when a response provided to a question handler included incorrect information; and
    re-dispatching at least a subset of the questions in response to detecting the response included incorrect information.

13. A method comprising:
    associating one or more question handlers with each of a plurality of nodes of a graph representing a program, the plurality of nodes being interconnected via a plurality of links;
    altering the graph by a question handler corresponding to one of the plurality of nodes adding one or more new nodes to the plurality of nodes; and
    disallowing any question handler corresponding to one of the plurality of nodes from deleting any of the plurality of nodes.

14. A method as recited in claim 13, further comprising altering the graph by the question handler adding one or more new links to the graph.

15. A method as recited in claim 13, further comprising disallowing any question handler from deleting any of the plurality of links.

16. A method as recited in claim 13, further comprising the question handler receiving a question requesting program code and altering the graph in response to the question.

17. A method as recited in claim 13, further comprising transforming the program into the desired output based at least in part on both the plurality of nodes and the plurality of question handlers.

18. At least one computer-readable memory containing a computer program that is executable by a processor to perform the method recited in claim 13.

19. A method for transforming a program represented as a graph into a desired output, the method comprising:
    receiving a first plurality of questions from a plurality of question handlers corresponding to a plurality of nodes of the graph;
    dispatching a second plurality of questions to the plurality of question handlers;
    receiving responses to the second plurality of questions from the plurality of question handlers;
    providing responses to the first plurality of questions to the plurality of question handlers;
    detecting when a response provided to a question handler of the first plurality of question handlers included incorrect information; and
    re-dispatching at least a subset of the second plurality of questions in response to detecting the response that included incorrect information.

20. A method as recited in claim 19, wherein the re-dispatching at least the subset of the second plurality of questions comprises re-dispatching the question that elicited the response that included incorrect information.

21. A method as recited in claim 19, further comprising maintaining a record of the first plurality of questions, the responses to the first plurality of questions, the second plurality of questions, and the responses to the second plurality of questions.

22. A method as recited in claim 19, wherein the detecting comprises:
comparing a change in the graph to a record of the first plurality of questions; and
determining, based on the comparing, whether a node corresponding to the first plurality of questions was affected by the change.

23. A method as recited in claim 22, wherein the comparing comprises comparing a newly added link in the graph or newly added binary information on a node to the record.

24. A method as recited in claim 23, wherein the determining comprises checking whether the response, the created nodes, the created links, the created binary information, or the questions asked for one of the first plurality of questions would have been different if the newly added link had been in the graph when the response was provided.

25. A method as recited in claim 19, wherein the re-dispatching comprises:
identifying the question that elicited the response that included the incorrect information;
identifying all questions dispatched after the question that elicited the response that included the incorrect information was dispatched; and
re-dispatching the question that elicited the response that included the incorrect information and all questions dispatched after the question that elicited the response that included the incorrect information was dispatched that could have been adversely affected by the incorrect information.

26. A method as recited in claim 19, further comprising receiving a question from a client and providing to the client, as a response to the question from the client, the program in the other language.

27. At least one computer-readable memory containing a computer program that is executable by a processor to perform the method recited in claim 19.

28. A system comprising:
a plurality of question handlers, wherein individual question handlers of the plurality of question handlers are associated with nodes of a graph representing a program; and
a reduction engine to transform the program into a desired output by,
receiving questions from the individual question handlers,
dispatching questions to the individual question handlers, and
providing responses to the individual question handlers.

29. A system as recited in claim 28, wherein the reduction engine is to begin transforming the program into the desired output in response to a question received from a client coupled to the reduction engine.

30. A system as recited in claim 28, wherein the system comprises a compiler.

31. A system as recited in claim 28, wherein the system comprises a computer including:
a processor; and
a memory to store the plurality of question handlers, the initialization program, and the reduction engine.

32. A system comprising:
an initialization program to associate one or more question handlers with each of a plurality of graph nodes representing a program; and
a reduction engine to transform the program into a desired output by,
dispatching questions to the plurality of question handlers,
receiving responses from the plurality of question handlers, and
providing the received responses to the appropriate ones of the plurality of question handlers.

33. A system as recited in claim 32, wherein the desired output comprises an intermediary language.

34. A system as recited in claim 32, wherein the appropriate one of the plurality of question handlers to receive a response to a question is the question handler that submitted the question.

35. A system as recited in claim 32, wherein the initialization program is capable of being expanded to include additional question handlers to associate with new instructions in the program.

36. A system as recited in claim 32, wherein the reduction engine includes a question record that identifies, for each question submitted to the reduction engine for dispatch to one of the plurality of question handlers,
the question submitted,
the parameters passed to the question;
the node corresponding to the question handler that submitted the question,
the node accessed by the question,
the nodes created by the question handler that answered the question,
the links created by the question handler that answered the question,
the other questions submitted by the question handler that answered the question, and
the response provided to the question handler that submitted the question.

37. A system as recited in claim 32, wherein the reduction engine stores a plurality of questions waiting to be dispatched.

38. A system as recited in claim 32, wherein the reduction engine includes a question manager to schedule the dispatching of questions.

39. A system as recited in claim 38, wherein the reduction engine further includes a plurality of rules for use by the question manager in scheduling the dispatching of instructions, the plurality of rules being generated during the transformation.

40. A computer-readable storage medium comprising computer-executable instructions that implement interface methods, the interface methods performing respective functions comprising:
dispatching a question to a question handler corresponding to a node of a graph representing a program;
dispatching a question to a question handler corresponding to a node coupled to a specified link; and
noting that further instructions cannot be executed by a question handler until an answer to a specified question is received by the question handler.

41. A computer-readable storage medium as recited in claim 40, the methods performing a further respective function comprising:
concurrently receiving a question to be dispatched to a question handler corresponding to a node and noting that further instructions cannot be executed by another question handler until an answer to the submitted question is received by the other question handler.

42. A computer-readable storage medium as recited in claim 40, the methods performing a further respective function comprising:

concurrently receiving a question to be dispatched to a question handler corresponding to a node coupled to a specified link and noting that further instructions cannot be executed by another question handler until an answer to the submitted question is received by the question handler.

43. A computer-readable storage medium as recited in claim 40, the methods performing a further respective function comprising:

dispatching a question to a plurality of additional question handlers and providing a response to the question without identifying how many nodes are linked to a node corresponding to a question handler that submits the question.

44. A computer-readable storage medium as recited in claim 40, the methods performing a further respective function comprising:

adding a question handler that overrides another question handler.

45. A method, implemented in a reduction engine communicating with a plurality of question handlers, of transforming a program into a desired output, the method comprising:

receiving, at the reduction engine, questions from individual question handlers of the plurality of question handlers, wherein the individual question handlers are associated with nodes of a graph representing the program;

dispatching, from the reduction engine, questions to the individual question handlers; and providing, by the reduction engine, responses to the individual question handlers.

46. A method as recited in claim 45, further comprising beginning, by the reduction engine, transforming the program into the desired output in response to a question received from a client.

47. One or more computer-readable media having stored thereon a plurality of instructions that, when executed by one or more processors, cause the one or more processors to:

associate one or more question handlers with each of a plurality of graph nodes representing a program; and implement a reduction engine to transform the program into a desired output by, dispatching questions to the plurality of question handlers, receiving responses from the plurality of question handlers, and returning the received responses to the appropriate ones of the plurality of question handlers.

48. One or more computer-readable media as recited in claim 47, wherein the appropriate one of the plurality of question handlers to receive a response to a question is the question handler that submitted the question.

49. One or more computer-readable media as recited in claim 47, wherein the reduction engine stores a plurality of questions waiting to be dispatched.

50. One or more computer-readable media as recited in claim 47, wherein the reduction engine includes a question manager to schedule the dispatched of questions.

51. One or more computer-readable media as recited in claim 50, wherein the reduction engine further includes a plurality of rules for use by the question manager in scheduling the dispatching of instructions, the plurality of rules being generated during the transformation.

\* \* \* \* \*

UNITED STATES PATENT AND TRADEMARK OFFICE
CERTIFICATE OF CORRECTION

PATENT NO. : 6,665,866 B1　　　　　　　　　　　　　　　　　　　　　　　　Page 1 of 1
DATED : December 16, 2003
INVENTOR(S) : Kwiatkowski et al.

It is certified that error appears in the above-identified patent and that said Letters Patent is hereby corrected as shown below:

Column 32,
Line 56, replace "handier" with -- handler --.

Column 34,
Line 30, replace "dispatched" with -- dispatching --.

Signed and Sealed this

Twenty-fourth Day of August, 2004

JON W. DUDAS
*Director of the United States Patent and Trademark Office*